(12) United States Patent
Asher et al.

(10) Patent No.: US 12,479,485 B2
(45) Date of Patent: Nov. 25, 2025

(54) THERMAL CART

(71) Applicant: BUCHER AEROSPACE CORPORATION, Everett, WA (US)

(72) Inventors: Darryld E. Asher, Graham, WA (US); Bryan T. Fine, Seattle, WA (US)

(73) Assignee: BUCHER AEROSPACE CORPORATION, Everett, WA (US)

( * ) Notice: Subject to any disclaimer, the term of this patent is extended or adjusted under 35 U.S.C. 154(b) by 842 days.

(21) Appl. No.: 17/747,455

(22) Filed: May 18, 2022

(65) Prior Publication Data

US 2023/0373545 A1 Nov. 23, 2023

(51) Int. Cl.
*B62B 3/00* (2006.01)

(52) U.S. Cl.
CPC ............ *B62B 3/005* (2013.01); *B62B 3/004* (2013.01); *B62B 2202/67* (2013.01); *B62B 2204/02* (2013.01)

(58) Field of Classification Search
CPC ......... B62B 3/005; B62B 3/003; B62B 3/004; B62B 3/00; B62B 3/002; B62B 2202/67; B62B 2204/02; B62B 2204/06; B62B 2204/00
See application file for complete search history.

(56) References Cited

U.S. PATENT DOCUMENTS

| | | | |
|---|---|---|---|
| 3,906,744 A | 9/1975 | Knapp et al. | |
| 4,781,243 A | 11/1988 | DeVogel et al. | |
| 4,936,377 A | 6/1990 | DeVogel et al. | |
| 5,069,466 A * | 12/1991 | Propst | A47B 31/00 |
| | | | 211/186 |
| 5,465,660 A * | 11/1995 | Conti | B64D 11/04 |
| | | | 100/48 |
| 5,605,344 A * | 2/1997 | Insalaco | B62B 3/00 |
| | | | 280/47.35 |
| 6,234,498 B1 * | 5/2001 | Saku | A47B 95/043 |
| | | | 280/651 |

(Continued)

OTHER PUBLICATIONS

Va-Q-TEC, Technical Data sheet, va-Q-pro, Product Description and Features. Mar. 26, 2020 (4 pages).

*Primary Examiner* — James M Dolak
(74) *Attorney, Agent, or Firm* — R. Reams Goodloe, Jr.

(57) ABSTRACT

A thermal cart for in-flight distribution of consumables. An enclosure is formed by thermally insulating material, including a first side panel, a second side panel, a top panel, a bottom panel, at least one door frame, and a door in each at least one door frame. A rear panel is provided in half-size carts where only one door frame and door are provided. Full size carts ae provided where a rear door frame and rear door are provided instead of a rear panel as used in the half-size cart. The thermally insulating material may include a thermoplastic inner lining, at least one vacuum insulated panel, and an outer structural panel. A plurality of rods is provided, each having end of rod tooling. Complementary tooled structures such as binding barrels, or sleeves, or threaded holes, are provided for joining with ends of the rods. Joints may be provided and secured to locate and provide resistance for securing the rods in tension. Frame assembly extrusions may join adjacent panels, and an inner elastomeric extrusion is provided with each frame assembly extrusion, to provide a seal with the thermoplastic inner lining.

25 Claims, 19 Drawing Sheets

(56) References Cited

U.S. PATENT DOCUMENTS

| | | | |
|---|---|---|---|
| 7,444,830 | B2 | 11/2008 | Moran et al. |
| 7,544,915 | B2 * | 6/2009 | Hu .......................... B62B 3/006 |
| | | | 280/47.36 |
| 7,942,430 | B2 * | 5/2011 | Van Loon .............. A47B 31/00 |
| | | | 16/351 |
| 8,360,447 | B2 * | 1/2013 | Knoppers ............... B62B 3/006 |
| | | | 292/7 |
| 8,472,274 | B2 | 6/2013 | Fai et al. |
| 8,596,655 | B2 * | 12/2013 | Belanger ............... B29C 66/126 |
| | | | 156/92 |
| 8,690,170 | B2 * | 4/2014 | Belanger ................ B29C 70/86 |
| | | | 280/79.11 |
| 9,033,278 | B2 * | 5/2015 | Van Loon .......... B64D 11/0007 |
| | | | 280/79.11 |
| 9,102,408 | B2 | 8/2015 | Hernanz Arbeloa et al. |
| 9,180,897 | B2 * | 11/2015 | Boivin .................... B62B 3/005 |
| 9,303,912 | B1 | 4/2016 | Schalla et al. |
| 9,446,847 | B2 | 9/2016 | Richardson et al. |
| 9,986,823 | B2 * | 6/2018 | Winter ................... A47B 69/00 |
| 10,407,173 | B2 | 9/2019 | Vandyke et al. |
| 11,214,373 | B2 * | 1/2022 | Schalla .................. B64D 13/08 |
| 2018/0346122 | A1 | 12/2018 | Kzrak et al. |

\* cited by examiner

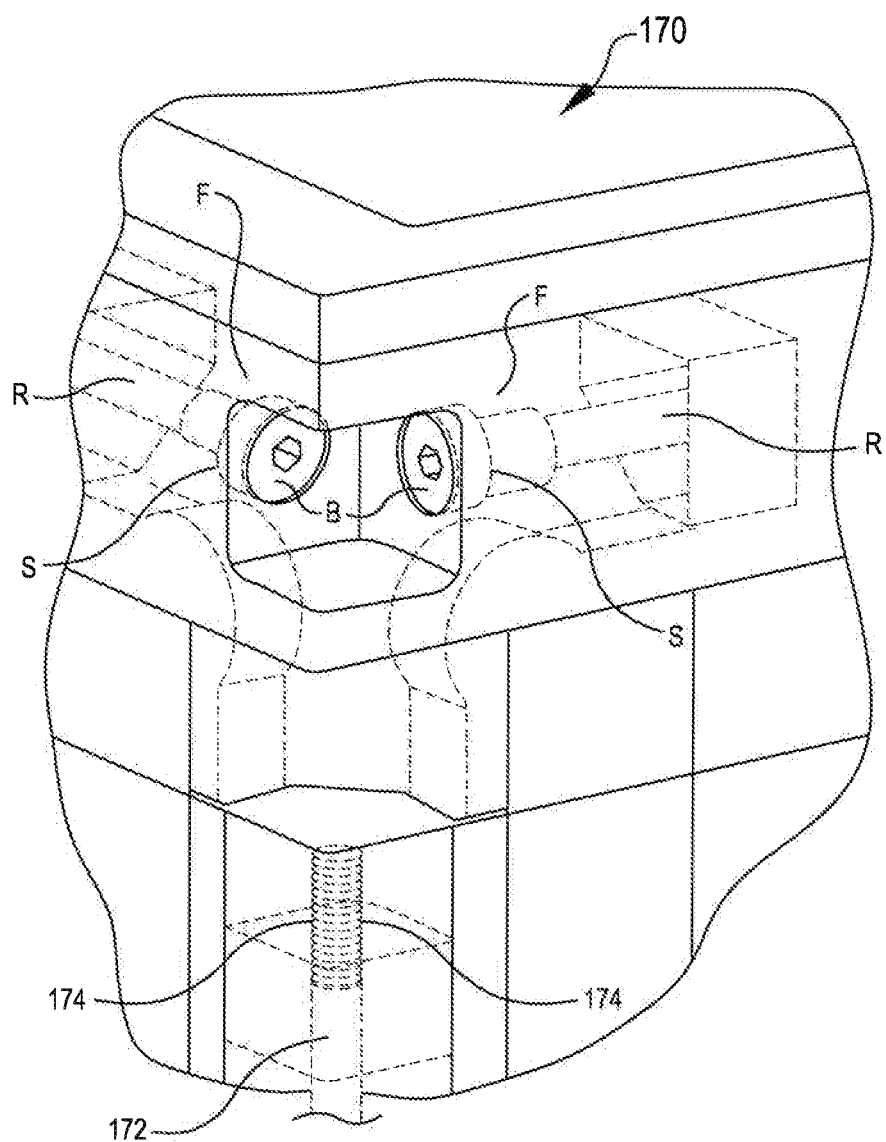

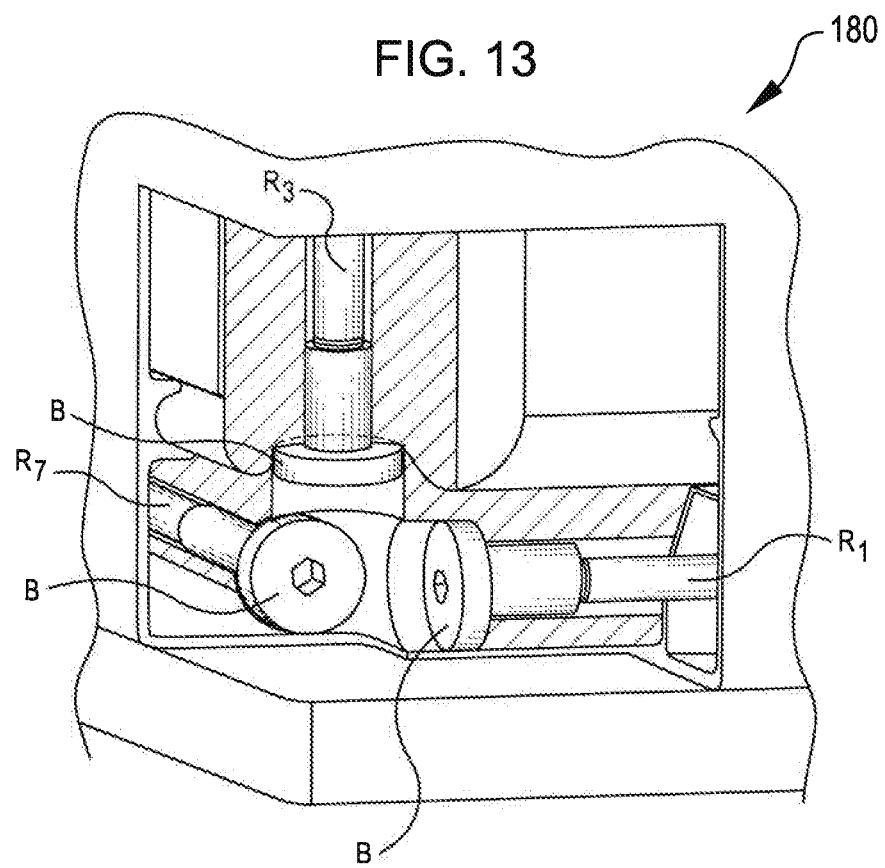

THERMAL CART

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

RELATED PATENT APPLICATIONS

None.

TECHNICAL FIELD

This disclosure relates to service carts for storage of consumables, such as foodstuffs, and which are adapted for carrying passenger meals on aircraft.

BACKGROUND

A continuing interest and need exists for improvements to service carts on aircraft, especially with respect to carts used for storing passenger meals until serving trays holding such meals are distributed. Often, considerable time elapses between the storage of meals into a service cart at a meal preparation facility and the removal of such meals for presentation to passengers. More particularly, on many long haul flights, would be desirable to assure that prepared meals are stored at safe temperatures until the meal is served.

Various aircraft galley cart systems have been developed, and some remain in use, that include addition of cooling systems or dry ice, to keep the interior of service carts (and the meals therein) at acceptable temperatures. However, most of such prior art systems involve substantial extra equipment weight, or additional consumable weight (e.g. ice or dry ice), and thus negatively affect available payload for aircraft using such systems.

Although some service cart systems have been developed which have attempted to minimize or to avoid use of additional coolants, in so far as we are aware, such prior art service carts have not been successful at sufficiently limiting heat transfer into carts due to the inherent nature of their construction, and thus, at least to some degree, additional weight of coolant material has not been minimized or fully avoided.

Consequently, a technical problem remains, namely the need to provide an improved design for service carts used in passenger aircraft, while minimizing or avoiding extra weight of mechanized cooling systems or the use of dry ice. It would be desirable to avoid such limitations while providing better and more reliable temperature profiles within their enclosed volume, to provide a technical solution that enables operators to minimize or eliminate the use of added coolant materials or chillers. A desirable technical solution would enable the preservation, or very slow degradation of internal temperatures during the course of long haul flights (e.g. even with the length of ten to twenty hours), until such time as meals are removed from the service cart and presented to passengers. Moreover, it would be advantageous if such an improved technical solution simultaneously resolves various practical problems, including (a) minimizing the empty weight of an advanced thermal cart, (b) providing structural components which securely join adjacent panels used to provide the thermal cart enclosure, to minimize heating of the enclosed volume, and (c) providing structural components which compress opposing panels together, to provide improved thermal barriers, and thus, minimize heating of contents of the service cart. Finally, it would be advantageous if such an improved service carts were sized and shaped to be a drop-in replacement for existing service carts, so that aircraft operators could easily provide a thermal service cart with improved performance, without need for retrofit of existing aircraft galley spaces.

SOME OBJECTS, ADVANTAGES, AND NOVEL FEATURES

Accordingly, one objective of the invention described herein is to provide a thermal cart with improved thermal performance, which is sized and shaped for simple roll-in/drop-in replacement by airlines who are using thermal carts while operating passenger aircraft.

Another objective of the thermal cart described herein invention is to provide a design for a service cart in which improved thermal performance is achieved with minimal or no weight penalty, as compared to equipment currently in service.

An advantage of the thermal carts described herein is that significantly improved temperature control is achieved, as compared to prior art thermal carts.

An advantage of the thermal carts described herein is that for multi-leg flights, such as an out-and-back flight, in many circumstances, catering may be done only at the origination airport, as cool temperatures of foodstuffs in the enclosure may enable the outbound flight to carry meals for the return flight.

A related and important objective is to provide a novel, improved thermal cart design which fully complies with structural requirements and fire resistance regulations for aircraft service carts.

SUMMARY

An improved thermal cart is provided for in-flight use on passenger aircraft, for distribution of foodstuffs. The thermal cart is provided in the form of a rectangular parallelepiped enclosure, provided by thermally insulating panels and at least one door frame and door all secured together with a plurality of tie-rods secured in tension, that provides an enclosure for cool or cold storage of consumables. In an embodiment, the enclosure may be provided by using an enclosure having a first side panel, a second side panel, a top panel, a bottom panel, a door frame, and a door. In a half-size thermal cart, a single door frame and door may be provided at the front, and a rear panel may be provided. In a full-size thermal cart, a front door frame and front door may be provided, and a rear door frame and rear door may be provided rather than a rear panel. In various embodiments, a rear panel, a first side panel, a second side panel, a top panel, a bottom panel, and each door frame and door are each fabricated using thermally insulating material. In an embodiment, the thermally insulating material may include (a) a thermoplastic inner lining, (b) at least one vacuum insulated panel, and (c) an outer structural panel. In an embodiment, the thermoplastic inner lining may be provided using a polycarbonate material. In an embodiment, the at least one vacuum insulated panel may be provided using a vacuum insulated panel having a thermal transmittance value of about zero point eight (0.8) watts per meter squared per degree Kelvin, or less. In an embodiment, the outer structural panel may be provided as a composite panel. In an embodiment, the outer structural panel may be provided using a polyurethane based foam core material with a phenolic pre-preg facing.

In an embodiment, such as may be utilized for a full-size thermal cart, an enclosure is provided using a first side panel, a second side panel, a top panel, a bottom panel, a front door frame with front door, and a rear door frame with rear door. Each of the door frames joins the door frame to the first side panel, the second side panel, the top panel, and to the bottom panel. In the full-size thermal cart, the rear door frame replaces the rear panel. In the full-size thermal cart, the rear door frame also replaces all of the frame assembly extrusions connecting to the back panel (i.e. the top panel, the bottom panel, the first side panel, and the second side panel) as utilized in the half-size thermal cart, as further discussed below. In a full-size thermal cart, a plurality of rods are provided horizontally oriented and secured in tension by adjustment between the end of rod tooling and complementary tooled structures, where the complementary tooled structures are secured at seats in the front door frame and in the rear door frame.

In an embodiment, such as may be utilized for a half-size thermal cart, a plurality of frame assembly extrusions are provided to join at least some adjacent panels (e.g. the rear panel with the top panel). Accordingly, in an embodiment, a first frame assembly extrusion connects the bottom panel and the rear panel. Similarly, in an embodiment, a second frame assembly extrusion connects the top panel to the rear panel. In an embodiment, a third frame assembly extrusion connects the first side panel to the rear panel. In an embodiment, a fourth frame assembly extrusion connects the second side panel to the rear panel. In an embodiment, a fifth frame assembly extrusion connects the first side panel to the top panel. In an embodiment, a sixth frame assembly extrusion connects the second side panel to the top panel. In an embodiment, a seventh frame assembly connects the first side panel to the bottom panel. And, in an embodiment, an eighth frame assembly connects the second side panel to the bottom panel.

Each of the frame assembly extrusions comprises an elongated member, where the elongated member includes a first flange, a second flange, and a strengthening portion. In an embodiment, the first flange and the second flange may be oriented at right angles, and the strengthening portion may be oriented to extend between the first flange and the second flange. In this manner, the first flange, the second flange, and the strengthening portion cooperate to provide, therebetween, a rod housing.

In various embodiments, rods are provided within frame assembly extrusions, and secured in tension, to tightly affixed panels joined by the rods against intervening panels. In this manner, for example, a rear panel and a door frame are urged toward each other using rods in tension, and thus, the rear panel and the door frame are tightly joined to side panels. In various embodiments, additional rods are provided without being housed within frame assembly extrusions, and are secured in tension, and are used to join opposing panels, or to secure a support tray.

In an embodiment, a first lower joint member and a second lower joint member, are provided. A lower rear rod is provided within a lower rear rod housing in the first frame assembly extrusion. The lower rear rod is secured in tension between the first lower joint member and the second lower joint member. Various configurations of components may be utilized for securing a rod in tension to join panels and thus provide a structurally sound enclosure. In an embodiment, a pair of binding barrels, or other fasteners with similar function, may be provided, and the lower rear rod may be provided using threaded ends. In such an embodiment, each one of the pair of binding barrels or similar fasteners are affixed to one of the threaded ends of the lower rear rod, and the lower rear rod is adjustably secured in tension between the first lower joint member and the second lower joint member. In an embodiment, rather than using a pair of binding barrels, a binding barrel may be used only at one end of a rod, and a threaded insert seated against a portion of a joint member may be used to fix the other end of a rod. Alternately, a threaded hole may be utilized in a corner joint, and the threaded rod is threaded into the threaded hole for secure attachment thereto. In any case, the rod is tensioned, to join panels together in a structurally strong configuration that creates a thermal barrier for maintenance of cool foodstuffs in the enclosed space provided by the thermal cart.

In an embodiment, a first upper joint member and a second upper joint member are provided. An upper rear rod is provided in upper rear rod housing in the second frame assembly extrusion. The upper rear rod is secured in tension between first upper joint member and the second upper joint member. In an embodiment, the upper rear rod may have threaded ends. In an embodiment, a pair of binding barrels may be provided. In such embodiment, each one of the pair of binding barrels is adjustably attached to one of the threaded ends of the upper rear rod, and the lower rear rod is adjustably secured in tension between the first lower joint member and the second lower joint member.

In an embodiment, a first vertical rod is provided, and it is located in the third frame assembly extrusion. The first vertical rod is secured in tension between the first lower joint member and the first upper joint member. In an embodiment, the first vertical rod further comprises threaded ends, and each one of the pair of binding barrels attaches to one of the threaded ends of the first vertical rod, and the first vertical rod is adjustably secured in tension between the first upper joint member and the first lower joint member.

In an embodiment, a second vertical rod is provided, and it is located in the fourth frame assembly extrusion. The second vertical rod is secured in tension between the second lower joint member and the second upper joint member. In an embodiment, the second vertical rod may have threaded ends, and a pair of binding barrels is provided. Each one of the pair of binding barrels attaches to one of the threaded ends of the second vertical rod, and the second vertical rod is adjustably secured in tension between the second upper joint member and the second lower joint member.

In an embodiment, a first right side rod is provided having threaded ends, and a pair of binding barrels is provided. In an embodiment, a first right side rod is located in a fifth rod housing in the fifth frame assembly extrusion. Each one of the pair of binding barrels or similar fasteners is attached to one of the threaded ends of the first right side rod, and adjustably tightened to thereby secure the first right side rod in tension between the first upper joint member and an upper right rod receiver of the plurality of rod receivers.

In an embodiment, a second right side rod is provided having threaded ends, and a another pair of binding barrels is provided. The second right side rod is located in a seventh rod housing in the seventh frame assembly extrusion. Each one of the pair of binding barrels or similar fasteners is attached to one of the threaded ends of the second right side rod, and adjustably tightened to thereby secure the first right side rod in tension between the first lower joint member and a lower right rod receiver of the plurality of rod receivers.

In an embodiment, a first left side rod having threaded ends is provided, and another pair of binding barrels is provided. In an embodiment, a first left side rod is located in a sixth rod housing in the sixth frame assembly extrusion. Each one of the pair of binding barrels is attached to one of the threaded ends of the first left side rod, and adjustably tightened to secure the first left side rod in tension between the second upper joint member and an upper left rod receiver of the plurality of rod receivers.

In an embodiment, a second left side rod having threaded ends is provided, and a another pair of binding barrels is provided. In an embodiment, a second left side rod is located in a eighth rod housing in the eighth frame assembly extrusion. Each one of the pair of binding barrels is attached to one of the threaded ends of the second left side rod, and adjustably tightened to secure the second left side rod in tension between the second lower joint member and a lower left rod receiver of the plurality of rod receivers.

In summary, a novel thermal cart is disclosed and described herein. The novel thermal cart may be provided as a half-size thermal cart, having a front door frame with door and a rear panel, or in a full size cart, where a front door frame and door are provided, and a rear door frame and rear door are provided instead of a rear panel as used in the half-size thermal cart. Improved multi-layer thermal panel construction, use of thermal and structural extrusions at the joints between thermal panels that provide unique thermal barriers, and novel structural components that tightly join panels together, provide a thermal cart suitable for long term storage of foodstuffs, especially adapted for use on long haul passenger aircraft flights.

BRIEF DESCRIPTION OF THE DRAWING

The present invention(s) will be described by way of exemplary embodiments, using for illustration the accompanying drawing in which like reference numerals denote like elements, and in which:

FIG. 5 provides a perspective view, and also showing the opposing latch keep, to show how a cam surface of the latch keep urges the latch end inward as the latch is rotated toward a locked position.

FIG. 6 provides a side view of a latch in an open position (in solid lines) and in a closed position (in broken lines), showing how the latch is moved to close and seal the door of the thermal cart against an elastomeric, compressible seal (see FIG. 4), to provide a securely sealed enclosed volume in a thermal cart.

FIG. 12 provides a cut-away perspective view of an upper (i.e. top) corner joint which may be especially useful in a half-size thermal cart, showing use of a corner joint member where binding barrels are being used to secure the ends of two threaded rods (here, horizontally oriented rods), and also illustrating that a tapped hole in a corner joint member which may be used to secure an end of a rod (here, the upper end of a vertically oriented rod), so as to secure the rods in tension.

FIG. 13 provides a cut-away perspective view of a lower (i.e. bottom corner) joint which may be especially useful in a half-size thermal cart, showing use of a corner joint member where binding barrels are being used to secure and ends of three threaded rods (here, two horizontally oriented rods and one vertically oriented rod), so as to secure the rods in tension.

FIG. 15 shows the use of a corner joint (which uses a binding barrel, alternately called a barrel nut, but not shown in this view) at the rear of a half-size thermal cart, and the use of the door frame with a barrel nut (shown) seated against the door frame at the front of the half-size cart.

FIG. 16 shows an embodiment for a full size thermal cart, where a front door frame with seat and barrel nuts are used to secure rods at the front, and where a rear door frame with seats and barrel nuts are used at the rear, to secure rods in tension.

FIG. 19 shows a cross-sectional view for an embodiment for an upper corner joint as may be used in an embodiment for a thermal cart, where provisions for securing rods in three different directions are provided.

FIG. 20 shows a cross-sectional view for an embodiment for a lower corner joint as may be used in an embodiment for a thermal cart, where provisions for securing rods in three different directions are provided.

FIG. 21 shows an embodiment for a lower corner joint, as just illustrated in FIG. 20, as incorporated into and secured in a corner of a thermal cart, and with insulation covering the various otherwise exposed portions of the lower corner joint.

FIG. 22 shows a perspective view of an embodiment for an upper corner joint, incorporating the corner joint as just illustrated in FIG. 19, as secured in a corner of a thermal cart, and with insulation covering the various otherwise exposed portions of the lower corner joint.

FIG. 23 provides a cross-sectional view of a corner frame joint as may be used to join rods in two directions.

FIG. 24 provides a perspective view of an embodiment for a corner frame joint in use, incorporating a corner frame joint as just illustrated in FIG. 23, as secured in a corner of a thermal cart, and with insulation covering the various otherwise exposed portions of the corner frame joint.

FIG. 25 provides a perspective view of an upper corner frame joint.

Figure 1:
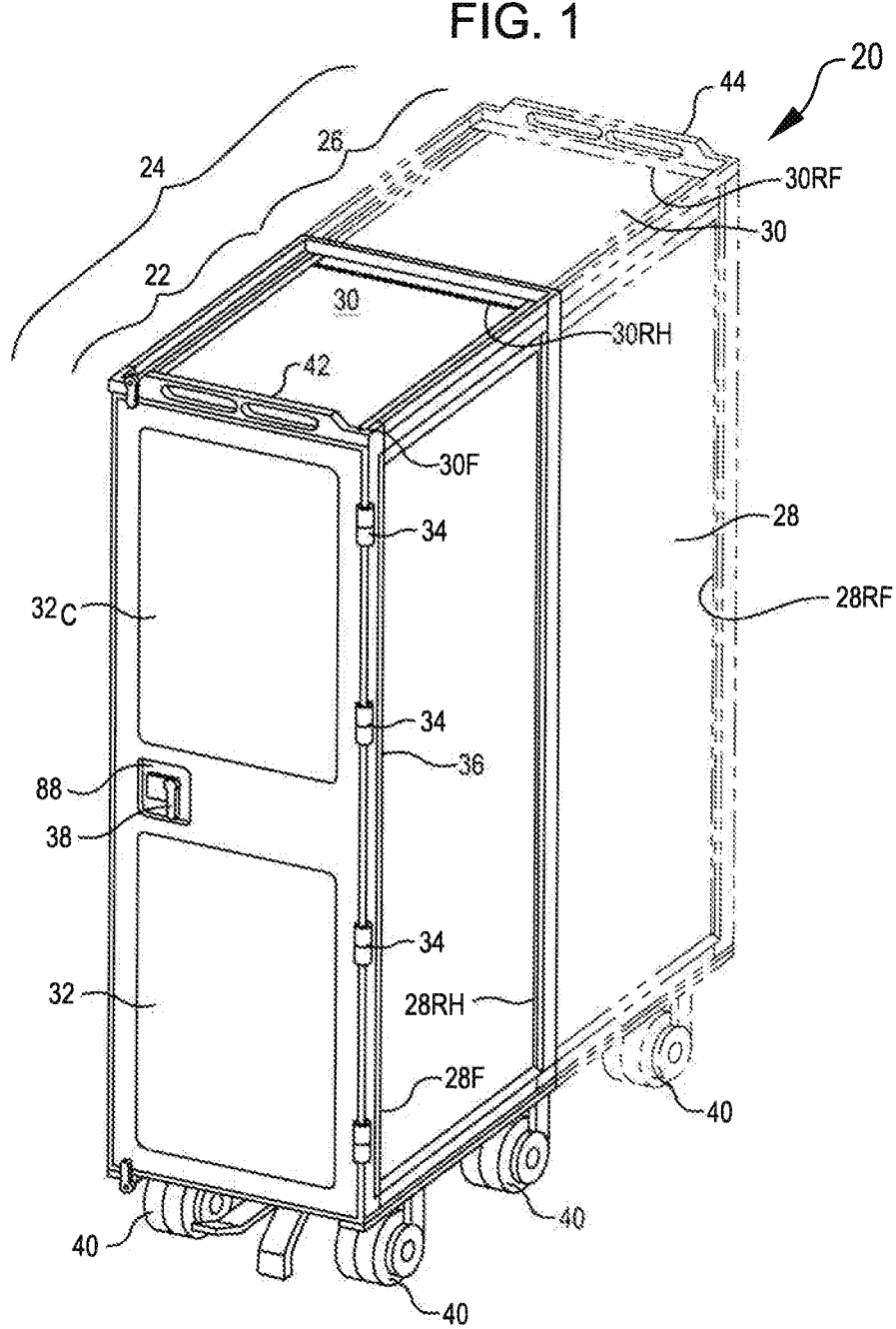
FIG. 1 is a perspective view of an embodiment for novel thermal cart, showing a half-size thermal cart and the top and first side panels thereof, as well as a door frame and door, and on wheels for movement on to, off of, and around while on board an aircraft, as well as showing the additional dimensions of a full size thermal cart in broken lines.

The foregoing figures, being merely exemplary, contain various elements that may be present or omitted from a final configuration for a thermal cart. Other variations in the construction of a thermal cart may use different materials of construction, variations in structures, or configurations that might provide for varying degrees of stiffness or locking force, between thermal panels and yet employ the principles described herein and as generally depicted in the drawing figures provided. An attempt has been made to draw the figures in a way that illustrates at least those elements that are significant for an understanding of an exemplary thermal cart for in-flight use on commercial aircraft to maintain foodstuffs at desirable low temperatures for extended periods of time, even as long as for flights of ten to twenty hours. Such details may be quite useful for providing a novel, improved thermal cart.

It should be understood that various features may be utilized, or omitted, in accord with the teachings hereof, as may be useful in variations of thermal carts of various sizes (e.g. half-size thermal carts or full-size thermal carts), depending upon specific design requirements, within the scope and coverage of the teachings herein, as defined by the claims.

DETAILED DESCRIPTION

Attention is directed to FIG. 1, where a perspective view is provided to illustrate various embodiments for a thermal cart 20, where a half-size thermal cart 22 is shown in black lines, and in which a full size thermal cart 24 is shown to include a rear portion 26, as shown in broken lines. In an embodiment, a full size thermal cart 24 would have full size thermal panels, i.e. full length to front to back thermal panels at the top, bottom, first side, and second side, e.g. where first side panel 28 extends from first side panel front 28F to first side panel rear 28RF (rather than to top panel rear 28RH for the half-size thermal cart 22), and where the top panel 30 extends from top panel front 30F to top panel rear 30RF (rather than to top panel rear 30RH for the half-size cart). The view shown in FIG. 1 also illustrates the use of a front door 32 affixed via hinges 34 to a front door frame 36, with a door latch 38 on the front door 32. Front door 32 is shown in a closed position $32_C$. Additionally, wheels 40 are shown, which are useful for moving the thermal cart 20 on to, off of, or around on an aircraft. Finally, a front handle 42, and rear handle 44 (used in a full size cart 24), are shown, as useful for moving the thermal cart 20.

Figure 11:
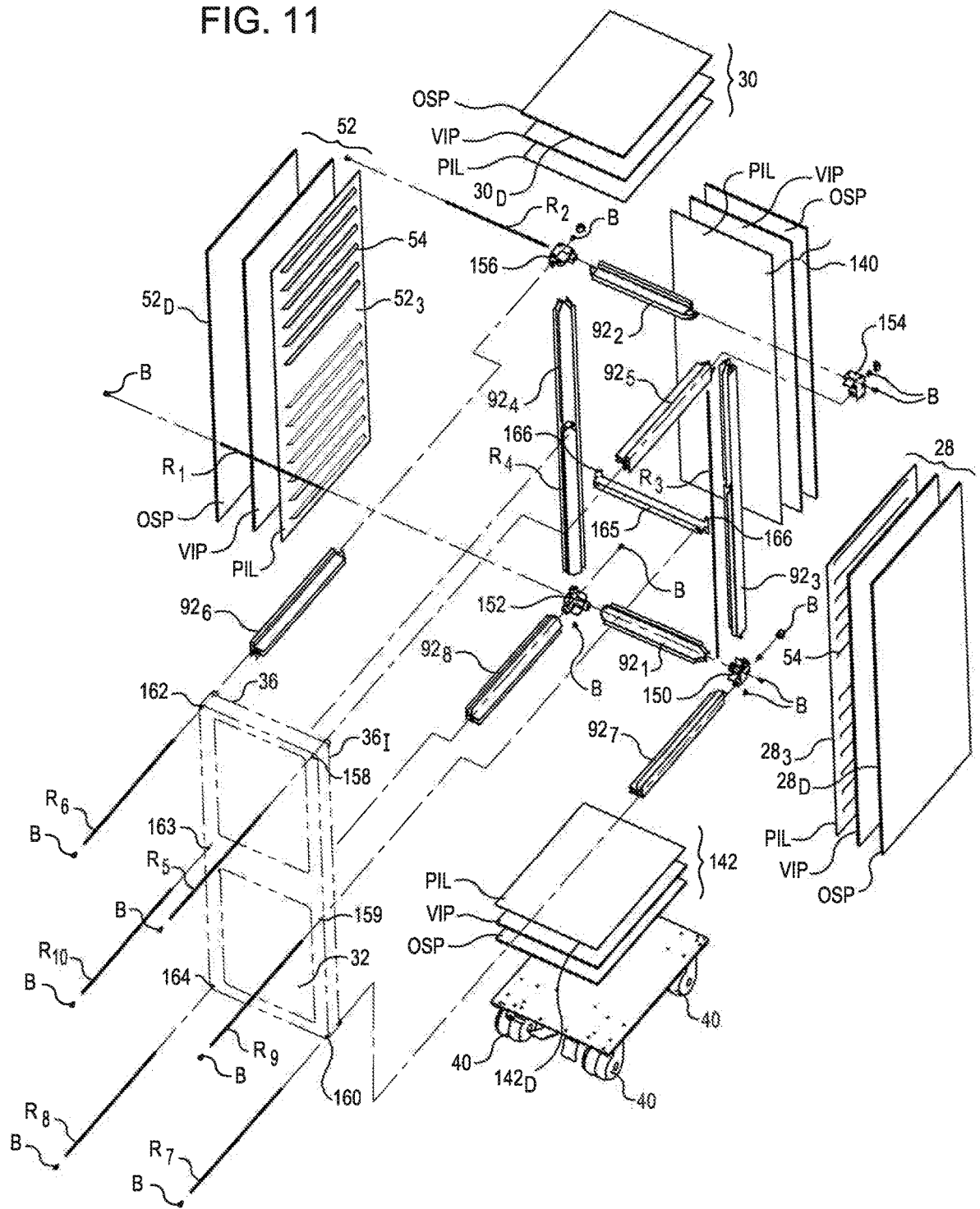
FIG. 11 provides an exploded perspective view of the various components used to assemble an embodiment of a thermal cart as set forth herein, showing the use of a rear panel, a first side panel, a second side panel, a top panel, and a bottom panel, wherein the rear panel, first side panel, second side panel, top panel, bottom panel are constructed using thermally insulating material, where the thermally insulating material has at least three components, including (a) a thermoplastic inner lining, (b) at least one vacuum insulated panel, and (c) an outer structural panel, and wherein a plurality of frame assembly extensions with inner elastomeric extrusions are provided, each frame assembly extension and accompanying inner elastomeric extrusion arranged to join a pair of adjacent thermal panels, and wherein rods having threaded ends are provided within the frame assembly extensions to join opposing panels, or the rear panel and a door frame, by adjustably securing the rods in tension.
Figure 11A:
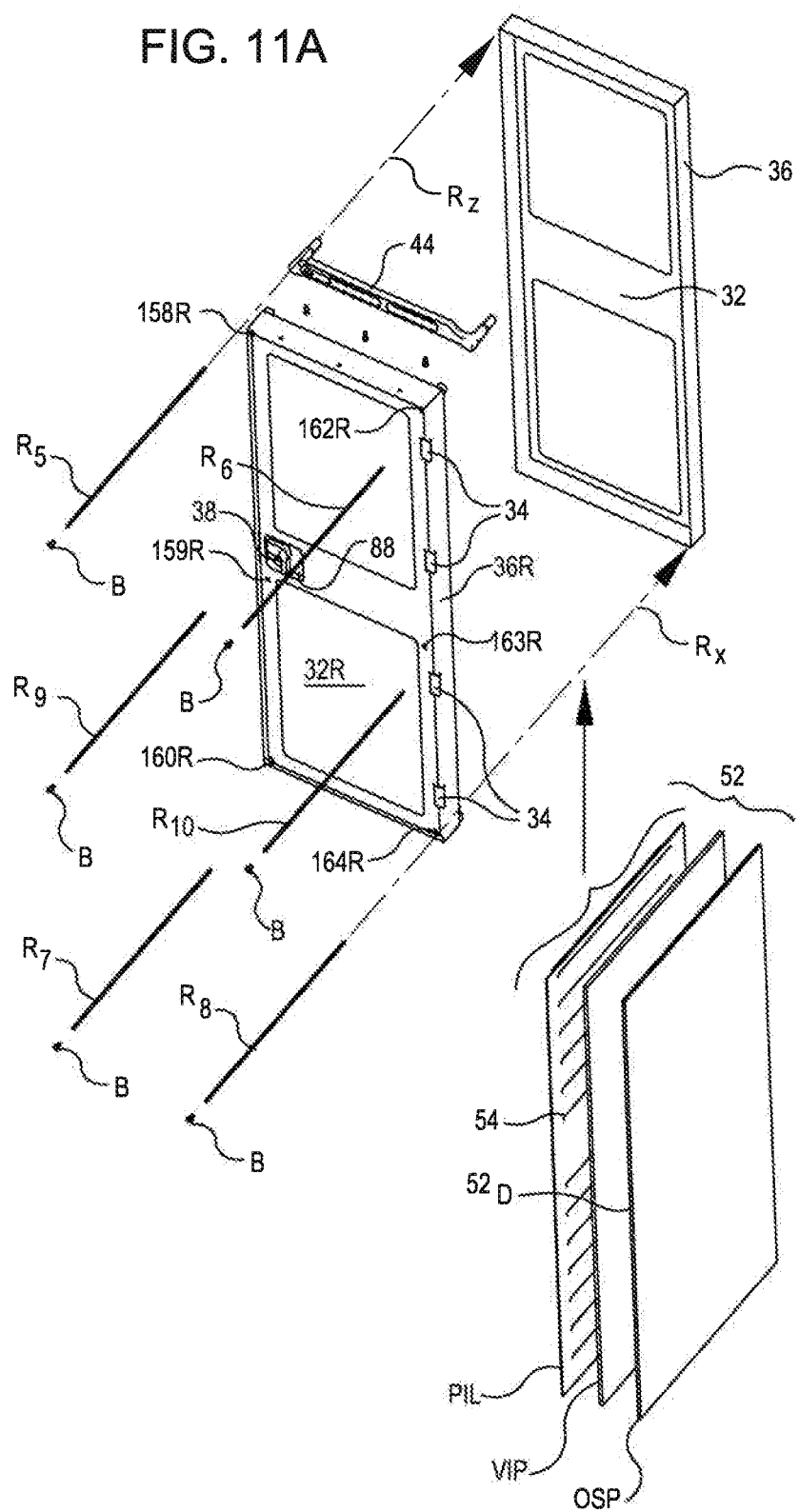
FIG. 11A provides a partial diagrammatic perspective view of some components utilized in a full-size thermal cart configuration, where a front door frame and front door are provided, and where a rear door frame and rear door are provided. In this embodiment, rods may be secured in tension at seats in the front door frame and in the rear door frame. Otherwise, panels with thermally insulating material are provided as noted in FIG. 11 above, and a plurality of frame assembly extensions with inner elastomeric extrusions are provided to join panels and door frames.

Assembly details and components utilized may differ between full size thermal carts 24 and half-size thermal carts 22, in various embodiments, as further addressed herein below. In particular, in an embodiment as may be utilized for a full-size thermal cart 24, an enclosure is provided using a first side panel 28, a second side panel 52, a top panel 30, a bottom panel 142, a front door frame 36 with front door 32, and a rear door frame 35R with rear door 32R (see diagrammatic representation in FIG. 11A). Each of the door frames may include a seal where the door frame joins to the first side panel 28, to the second side panel 52, to the top panel 30, and to the bottom panel 142. In the full-size thermal cart 24, the rear door frame 36R replaces the rear panel 140 that is used in a half-size thermal cart 22. In the full-size thermal cart 24, the rear door frame 36R also replaces all of the frame assembly extrusions (including extrusions $92_1$, $92_2$, $92_3$, and $92_4$) connecting to the back panel 140 (a) to the bottom panel 142, (b) to the top panel 30, (c) to the first side panel 28, and (d) to the second side panel 52, as such frame assembly extrusions 92 are utilized in the half-size thermal cart 22. A plurality of horizontal rods R are provided in a full size thermal cart 24, including $R_5$, $R_9$, and $R_7$ on a second side (corresponding to second side panel 52) of rear door frame 36R, and $R_6$, $R_{10}$, and $R_8$ on a first side (corresponding to first side panel 28) of rear door frame 36R, as seen in FIG. 11A. Rods R may be inserted as indicted by reference arrows $R_X$ and $R_Z$, and secured in tension between apertures with seats (158R, 159R, 160R, 162R, 163R, and 164R) in the rear door frame 36R, and corresponding apertures with seats (158, 159, 160, 162, 163, and 164) in the front door frame 36 (as seen in FIG. 11). End of rod tooling ("EORT") which in an embodiment may be threads and a complementary tooling structure ("CTS") which may be a threaded insert in a binding barrel B, may be used to adjustably secure the rods R in tension.

Figure 2:
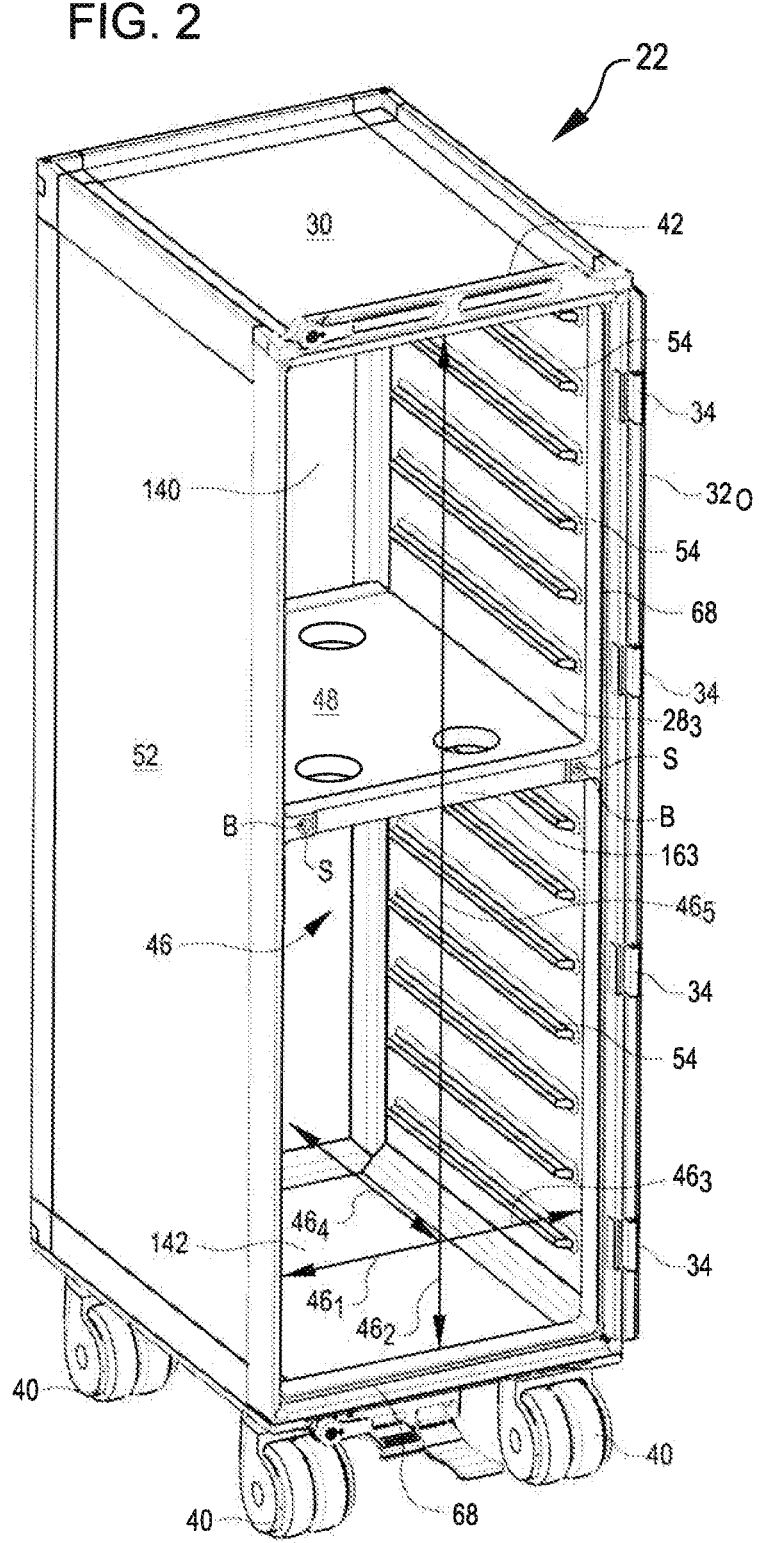
FIG. 2 is a perspective view of an embodiment for a half-size thermal cart, showing a second side thermal panel, top thermal panel, bottom thermal panel, the door frame with compressible seal, and interior ledges for supporting trays or the like on which foodstuffs (not shown) may be placed.
Figure 3:
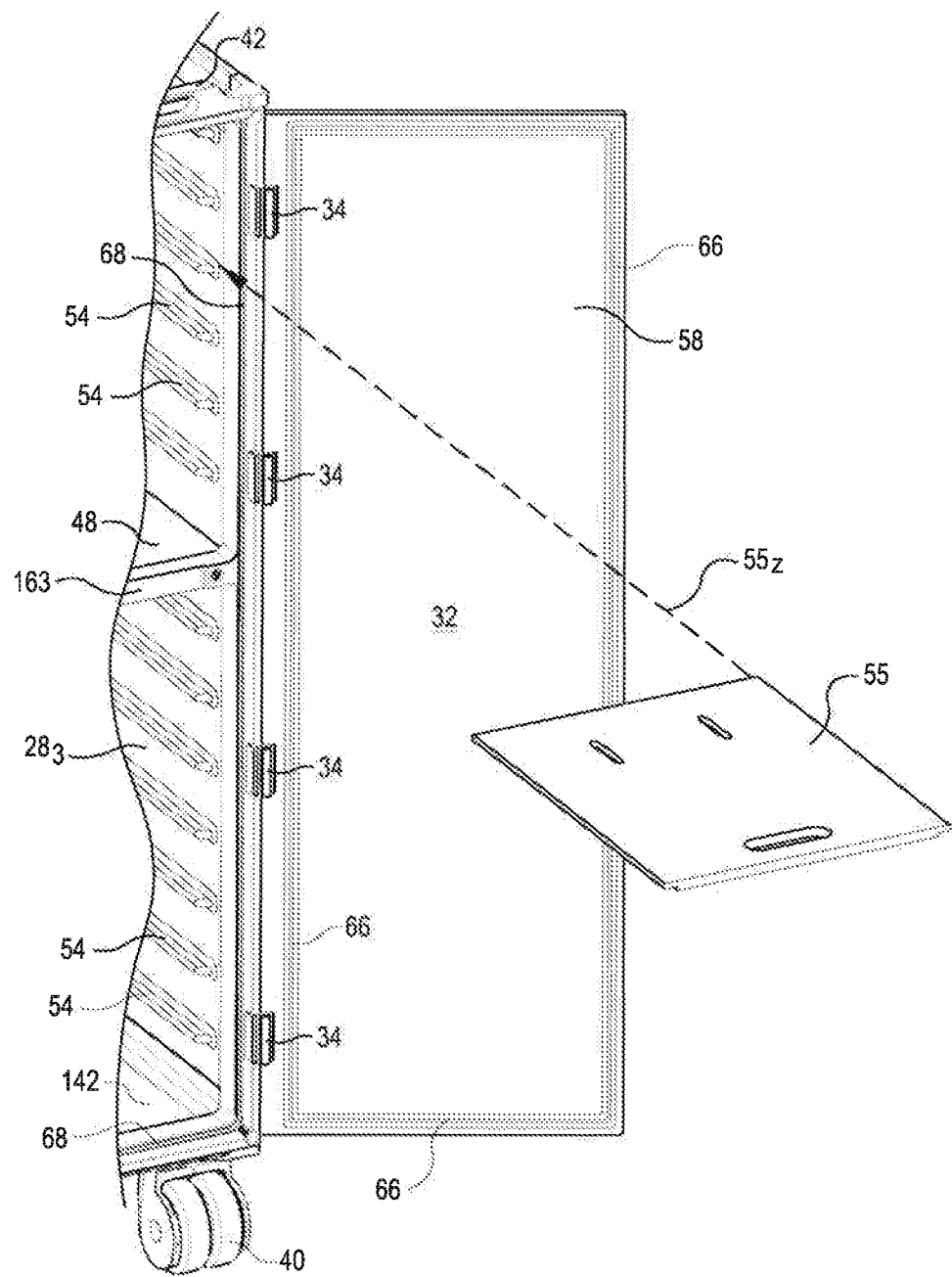
FIG. 3 is a perspective view of an embodiment for a thermal cart, showing interior ledges for supporting trays or the like on which foodstuffs (not shown) may be placed, as well as showing portions of the door frame, a door which may be closed against a compressible seal in the door frame, and a self-contained ice shelf which may be used for extended flight hour operations to maintain temperature in the thermal cart.

Turning now to FIG. 2, a half-size thermal cart 22 is shown with door 32 in an open position $32_O$, so that access to an internal volume 46 (further illustrated by reference arrows $46_1$, $46_2$, $46_3$, $46_4$, and $46_5$) for cool storage of consumables such as foodstuffs is provided. In an embodiment, a support shelf 48 may be provided. As may be better appreciated by further reference to FIGS. 3 and 11, in an embodiment, a first side panel 28 and a second side panel 52 may each include an inner wall ($28_3$ and $52_3$, respectively), wherein each of the inner walls $28_3$ and $52_3$ further include a plurality of internal ledges 54. The internal ledges 54 are disposed at horizontally opposed locations on the inner wall $28_3$ of the first side panel 28 and on the inner wall $52_3$ of the second side panel 52. Ledges 54 are sized and shaped to receive trays (not shown) for carriage of consumables to be kept cold, such as foodstuffs. Additionally as shown in FIG. 3, and further discussed below, one or more ice trays 55 may be utilized on long haul flights, as necessary to maintain a desired temperature within the enclosure provided by a half-size thermal cart 22 or full-size thermal cart 24. Ice trays 55 may be inserted for placement on a pair of opposing internal ledges 54, as indicted by reference arrow $55_Z$ in FIG. 3.

Figure 4:
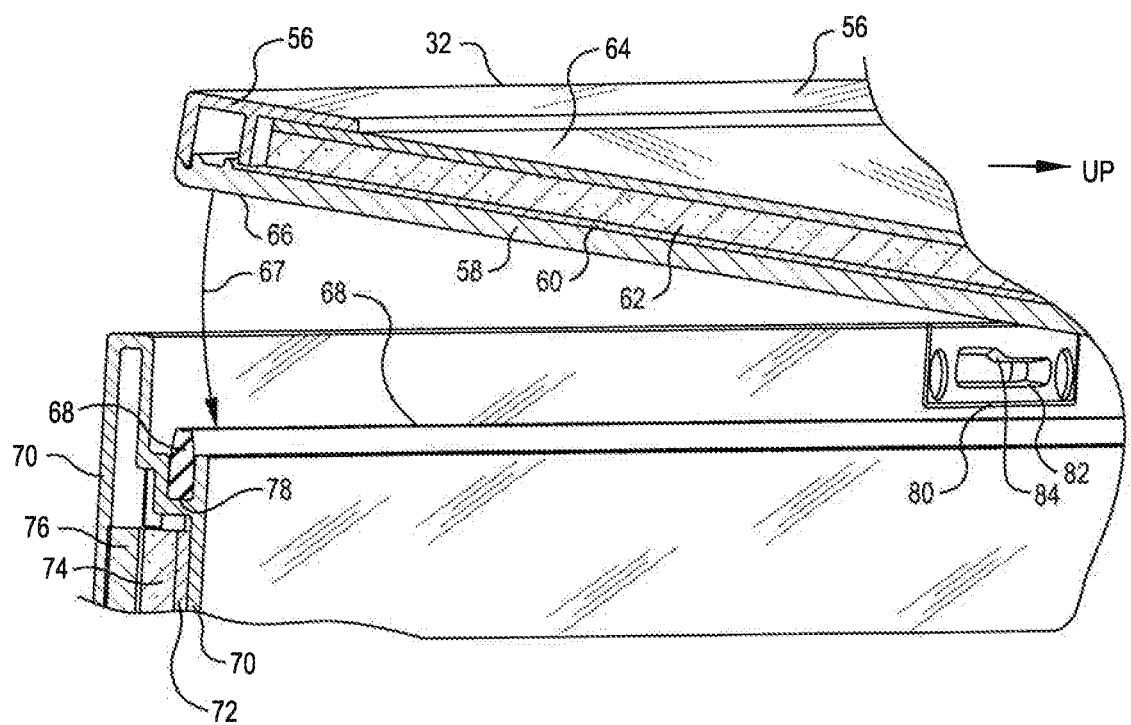
FIG. 4 is a partial sectional view, showing a portion of the door frame and a latch keep, and the compressible seal used to provide a thermal barrier when the door is closed and latched.
Figure 5:
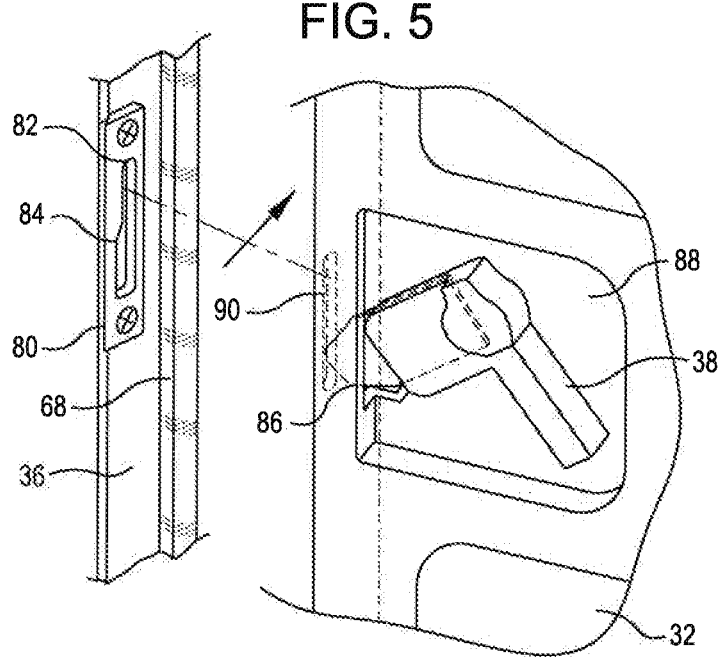
FIGS. 5 and 6 provide views of the use of a latch and a latch keep with a cam surface, where the latch is urged inward to compress a seal (see also FIGS. 2, 3, and 4) as the latch is urged to its closed, locked position.
Figure 6:
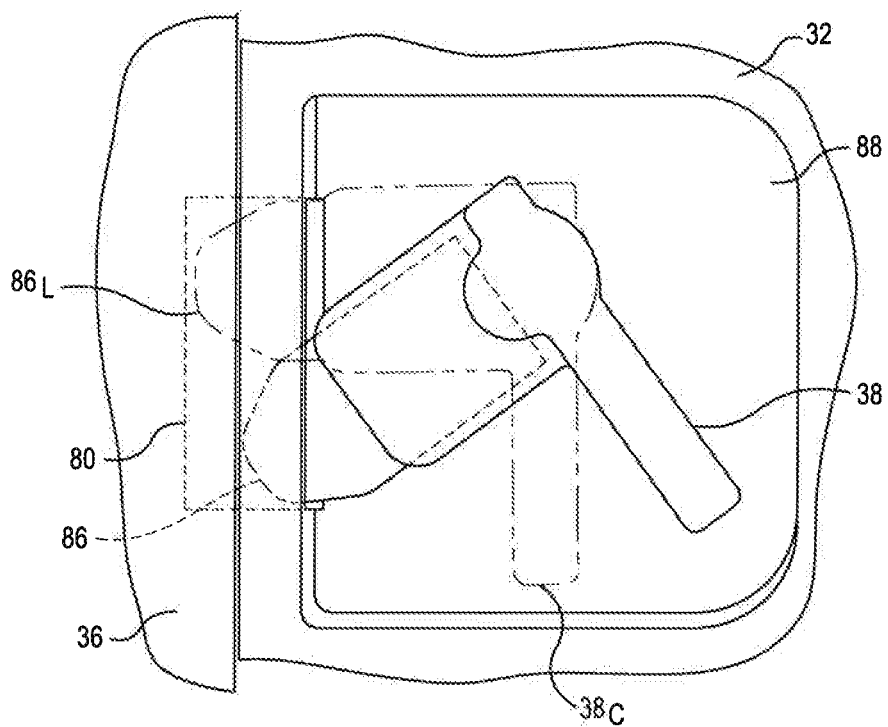

Attention is directed to FIGS. 4, 5, and 6, where details of a door 32 and adjacent door frame 36 are shown, as well as use of door latch 38 to secure the door 32 in a closed position $32_C$ as noted above. In an embodiment, door 32 may include an outer, first injection molded door panel 56 and an inner, second injection molded door panel 58. In an embodiment, a thermoplastic inner lining 60 may be provided. At least one vacuum insulated panel 62 is provided. And, an outer panel 64 is provided. As seen in FIG. 4, in an embodiment an outer portion 66 of the inner, second injection molded door panel 58 is closed by movement in the direction of reference arrow 67 against an overmolded, compressible seal 68 in door frame 36. The door frame 36 may include an injection molded portion 70. A thermoplastic inner lining 72 may be provided in door frame 36. At least one vacuum insulated panel 74 may be provided in door frame 36. An outer structural panel 76 may be provided in door frame 36. The overmolded compressible seal 68 may be set in a groove 78 provided in the injection molded portion 70 of the door frame 36.

As seen in FIGS. 4, 5, and 6, a latch keep 80 with latch guide 82 having a cam surface 84 is provided. The latch keep 80 is located on door frame 36 in a position to receive a working end portion 86 of door latch 38. The door latch 38 is pivotally mounted in a recessed portion 88 of door 32, which allows working end portion 86 to pivot through slot 90 in door 32. As can be appreciated from FIGS. 4 and 5, the cam surface 84 urges the working end portion 86 of the door latch 38 inward, to compress the outer portion 66 of the inner, second injection molded door panel 58 against the overmolded compressible seal 68. Thus, as the door latch 38 is moved from an open position as shown in FIGS. 5 and 6, to a closed position $38_C$ as indicated in broken lines in FIG. 6, the door 32 is compressed against the compressible seal 68, and the latch may be locked at position 86L as noted in FIG. 6. As may be appreciated from FIGS. 2 and 3, in an embodiment the compressible seal 68 is provided around the perimeter of the door frame 36, as mirrored by outer portion 66 of the inner, second injection molded door panel 58 as seen in FIG. 3. In this manner, the compressible seal 68 and the door 32 cooperate to effectively seal the door 32 to door frame 36 interface, and thereby avoid entry of warm outside air to the enclosed internal volume 46, and prevent loss of cold air from the enclosed internal volume 46.

Particulars for an embodiment of a frame assembly extrusion 92 (without a top rail) or 92R (with a top rail 93) and an accompanying inner elastomeric extrusion 116, are provided in FIGS. 7, 8, 9, and 10. In various embodiments, a frame assembly extrusion 92 includes an elongated member 94 having a length L. The elongated member 94 includes a first flange 96, a second flange 98, and a strengthening portion 100. In an embodiment, the first flange 96 and the second flange 98 may be oriented at a right angle. In an embodiment, the strengthening portion 100 extends between the first flange 96 and the second flange 98. In an embodiment, the first flange 96, the second flange 98, and the strengthening portion 100 cooperate to provide a rod housing 101 defined by interior sidewalls 102.

Figure 9:
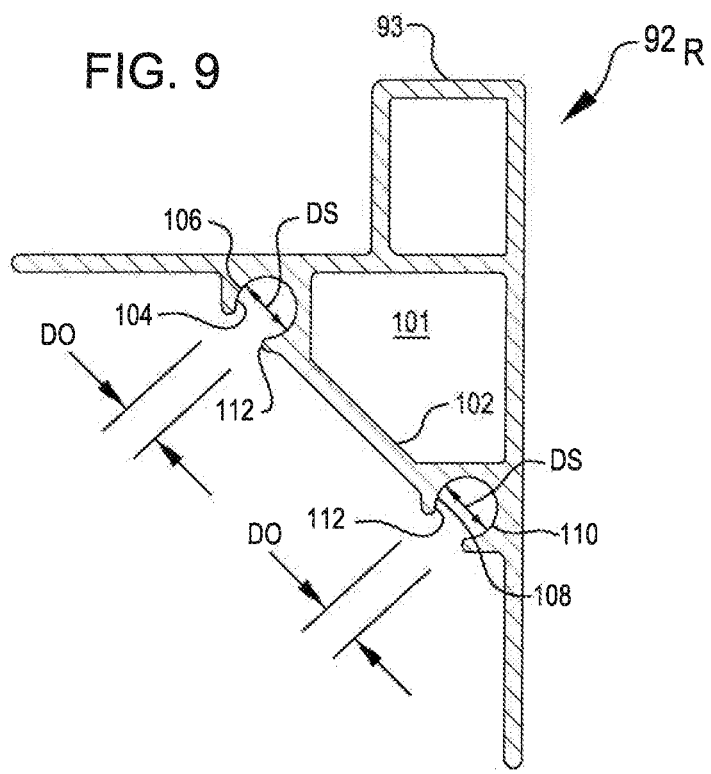
FIG. 9 provides a cross-sectional view of an embodiment for a frame assembly extrusion which may be used to connect adjacent thermal panels, for example in connecting the top thermal panel to a first side thermal panel, or the top thermal panel to a second side thermal panel. Additionally, in this embodiment, a top rail is provided as a part of the frame assembly extrusion.
Figure 10:
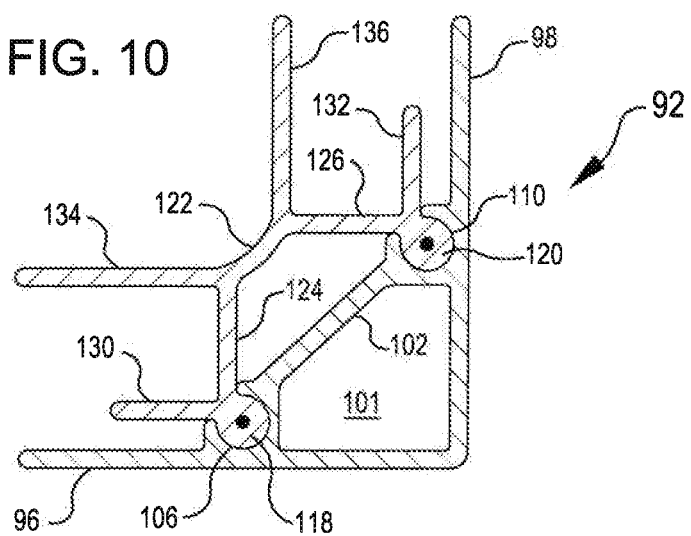
FIG. 10 provides a cross-sectional view of another embodiment for a frame assembly extrusion (without a top rail) which may be used to connect adjacent thermal panels, for example in connecting a bottom thermal panel to a first side thermal panel, or the bottom thermal panel to a second side thermal panel. Additionally, in this an inner elastomeric extrusion is shown in working position engaged with and locked into a working position in the frame assembly extrusion, where the bead accepting slots are provided in the frame assembly extrusion, and where the inner elastomeric extrusion is provided with a first bead portion sized and shaped for sliding interlocking engagement with a first bead accepting slot, and a second bead portion sized and shaped for sliding interlocking engagement with the second bead accepting slot, and with a generally V-shaped structure having a base portion connecting the first bead portion and the second bead portion, as well as first and second outer flanges that provide a seal against adjacent thermal panels.

In an embodiment, the strengthening portion 100 of the elongated member 94 of one or more of the frame assembly extrusions 92 further includes a first slot wall 104 defining a longitudinally extending first bead accepting slot 106. Likewise, a second slot wall 108 is provided to define a longitudinally extending second bead accepting slot 110. As seen in FIG. 9, in an embodiment, the first bead accepting slot 106 and the second bead accepting slot 110 each comprise an elongated partially cylindrical slot having an internal diameter DS. In an embodiment, the elongated partially cylindrical slots 106 and 110 may further include a neck 112 opening of width DO, wherein the neck opening width DO is less than the internal diameter DS.

In various embodiments, inner elastomeric extrusions 116 may be provided for use with frame assembly extrusions 92. Inner elastomeric extrusions 116 include first bead portion 118 sized and shaped for sliding (see reference arrow $V_1$ in FIG. 8) interlocking engagement into the first bead accepting slot 106. The second bead portion 120 sized and shaped for sliding (see reference arrow $V_2$ in FIG. 8) interlocking engagement with the second bead accepting slot 110. A generally V-shaped structure 121 having a base portion 122 and sides 124 and 126 connects the first bead portion 118 and the second bead portion 120.

In various embodiments, the inner elastomeric extrusion 116 further includes a first outer flange 130, wherein the first outer flange 130 extends outward from the first bead portion 118. In an embodiment, the inner elastomeric extrusion 116 further includes a second outer flange 132, wherein the second outer flange 132 extends outward from the second bead portion 120. In various embodiments, the inner elastomeric extrusion 116 further includes a first inner flange 134, wherein the first inner flange 134 extends outward from the inner side $121_N$ of the generally V-shaped structure 121. Additionally, the inner elastomeric extrusion 116 may further include a second inner flange 136, which also extends outward from the inner side $121_N$ of the generally V-shaped structure 121.

Figure 7:
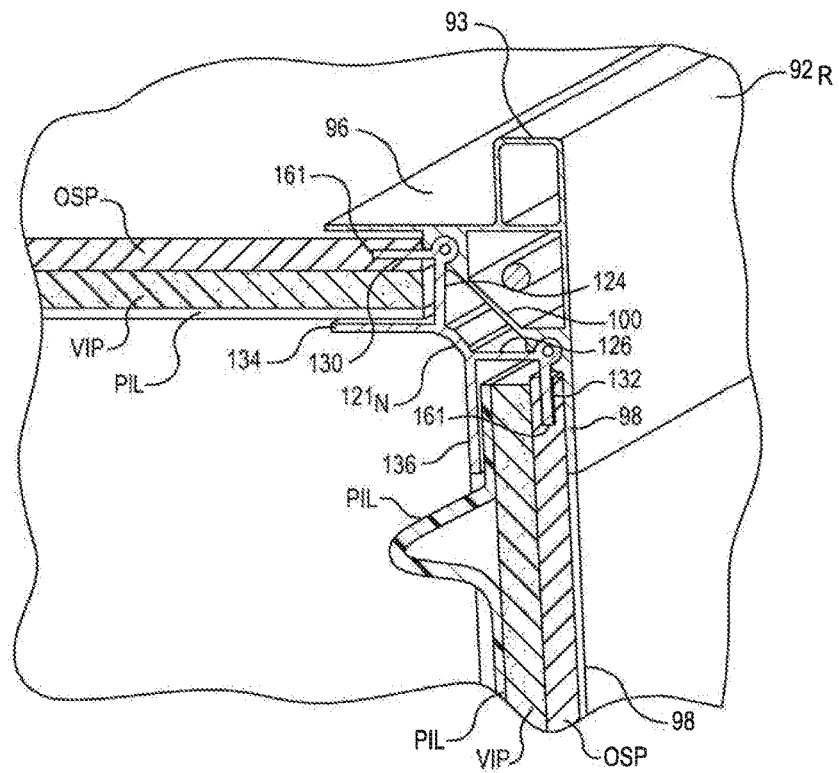
FIG. 7 is a partial cross-sectional view of a joint between adjacent thermal panels, here showing the use of a frame assembly extrusion that connects the top thermal panel to a first side thermal panel, wherein the frame assembly extrusion has first flange and a second flange, and an inner elastomeric extrusion, shown in an embodiment where bead accepting slots are provided in the frame assembly extrusion. The inner elastomeric extrusion is provided with a first bead portion sized and shaped for sliding interlocking engagement with the first bead accepting slot, and a second bead portion sized and shaped for sliding interlocking engagement with the second bead accepting slot, and with generally V-shaped structure having a base portion connecting the first bead portion and the second bead portion, as well as first and second outer flanges that provide a seal against the top thermal panel and the first side thermal panel. As shown, the frame assembly extrusion may further include a top rail portion, the outer wall of which may extend upward from a first flange of the frame assembly extrusion.
Figure 17:
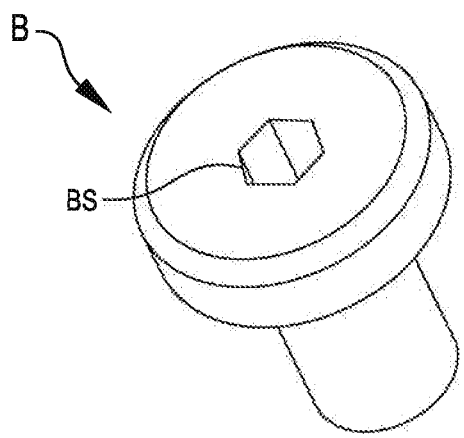
FIG. 17 is an isometric view of an embodiment for a binding barrel, showing the flanged head against which tension in a rod is achieved as the binding barrel is tightened, which may be done using the hex-shaped socket in the head of the binding barrel with a complementary tool such as a hex-head Allen® wrench.
Figure 18:
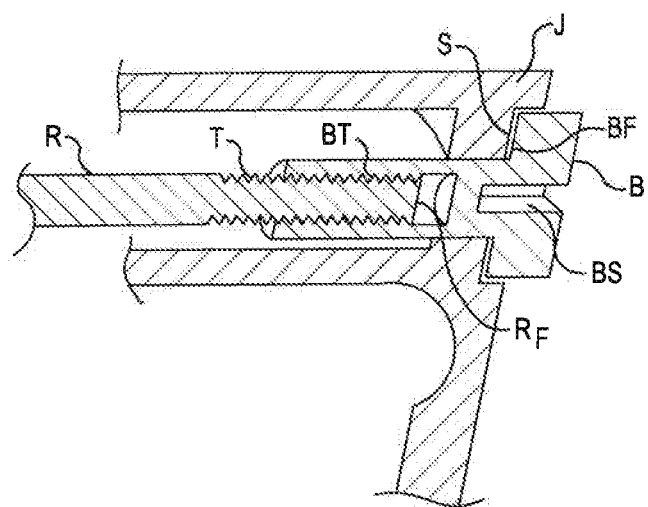
FIG. 18 is a partial cut-away cross-section of a corner joint, showing how the flanged head of a binding barrel acts against a seat in the corner joint, to provide tension in threaded rods.

As seen in FIG. 7, and further shown in FIG. 11, a plurality of rods R may be provided for tightly securing thermal panels in a thermal cart. In various embodiments, at least some of rods R may be located within a rod housing 101. In the various embodiments, end of rod tooling ("EORT") is provided to enable rods R to be tensioned using a complementary tooled structure ("CTS") affixed to the ends of each of rods R, where the CTS utilized is sized and shaped for complementary engagement with the EORT provided on a particular rod R. In various embodiments, joints are provided, where the joints have a passageway sized and shaped for insertion of rods R therethrough, so that the EORT (e.g. threads) is then secured by a CTS for tensioning. In an embodiment, as shown in FIG. 18, rods R may be provided which have first end $R_F$ and second end $R_S$ (second end $R_S$ not shown, but same as first end $R_F$) which are both threaded (with threads T), and the joints J include a seat S against which a binding barrel B having complementary interior threads (BT) can be tightened (e.g. binding barrel flange BF against seat S in joint J), to place the rod R in tension. As shown in FIG. 17, in an embodiment, a binding barrel B may include a socket BS such as a hex head shape, suitable for adjustment using an Allen® wrench or similar tool. Use of tie-rods R provides for increased strength and durability, as well as enhancing thermal performance by helping to minimize leaks, in the thermal carts as described and claimed herein.

Attention is directed to FIG. 11, where details for an embodiment for a half-size thermal cart 22 are depicted. The half-size thermal cart 22 is configured for holding consumables for in-flight distribution on an aircraft. The half-size thermal cart 22 provides an enclosure including a rear panel 140, a first side panel 28, a second side panel 52, a top panel 30, a bottom panel 142, a front door frame 36, and a front door 32. The enclosure provides an internal volume 46 for cool storage of consumables. The rear panel 140, first side panel 28, second side panel 52, top panel 30, bottom panel 142, and front door 32 each are provided utilizing a thermally insulating material. In an embodiment, the thermally insulating material may include (a) a thermoplastic inner lining PIL (b) at least one vacuum insulated panel VIP, and (c) an outer structural panel OSP. In an embodiment, the thermoplastic inner lining PIL may be provided in a polycarbonate material. In an embodiment, the polycarbonate material may be provided in Lexan F60025, from Total Plastics International, 2810 North Burdick Street, Kalamazoo, Michigan 49004, USA, or Boltaron 4330, from SIMONA Boltaron Inc., 1 General Street, Newcornerstown, Ohio, 43832, USA, or a polycarbonate material with equivalent thermal transmittance. In an embodiment, a vacuum insulated panel may be provided using commercially available 5 mm thickness panel, using a silicic acid powder in a gas barrier film, such as VA-Q-PRO or VA-Q-VIP, available from Va-Q-Tec, Alfred-Nobel-Str. 33, 97080 Wurzburg, Germany. In an embodiment, the at least one vacuum insulated panel is provided using a vacuum insulated panel having a thermal transmittance value of about zero point eight (0.8) watts per meter squared per degree Kelvin, or less. In an embodiment, the outer structural panel OSP may be provided in a polyurethane based foam core material with a phenolic pre-preg facing.

In various embodiments, a plurality of frame assembly extrusions 92 may be provided. As shown, but not necessarily always required, frame assembly extrusions 92 may be advantageously disposed as follows: A first frame assembly extrusion $92_1$ connects the bottom panel 142 and the rear panel 140. A second frame assembly extrusion $92_2$ connects the top panel 30 to the rear panel 140. A third frame assembly extrusion $92_3$ connects the first side panel 28 to the rear panel 140. A fourth frame assembly extrusion $92_4$ connects the second side panel 52 to the rear panel 140. A fifth frame assembly extrusion $92_5$ connects the first side panel 28 to the top panel 30. A sixth frame assembly extrusion $92_6$ connects the second side panel 52 to the top panel 30. A seventh frame assembly extrusion $92_7$ connects the first side panel 28 to the bottom panel 142. And, an eighth frame assembly extrusion $92_8$ connects the second side panel 52 to the bottom panel 142.

As noted above in discussion of FIGS. 7 and 8, the frame assembly extrusions 92 include an elongated member, where the elongated member includes a first flange 96, a second flange 98, and a strengthening portion 100. The first flange 96 and the second flange 98 are oriented at a right angle, and the strengthening portion 100 extends between the first flange 96 and the second flange 98. In various embodiments, the first flange 96, the second flange 98, and the strengthening portion 100 cooperate to provide a rod housing 101.

Figure 8:
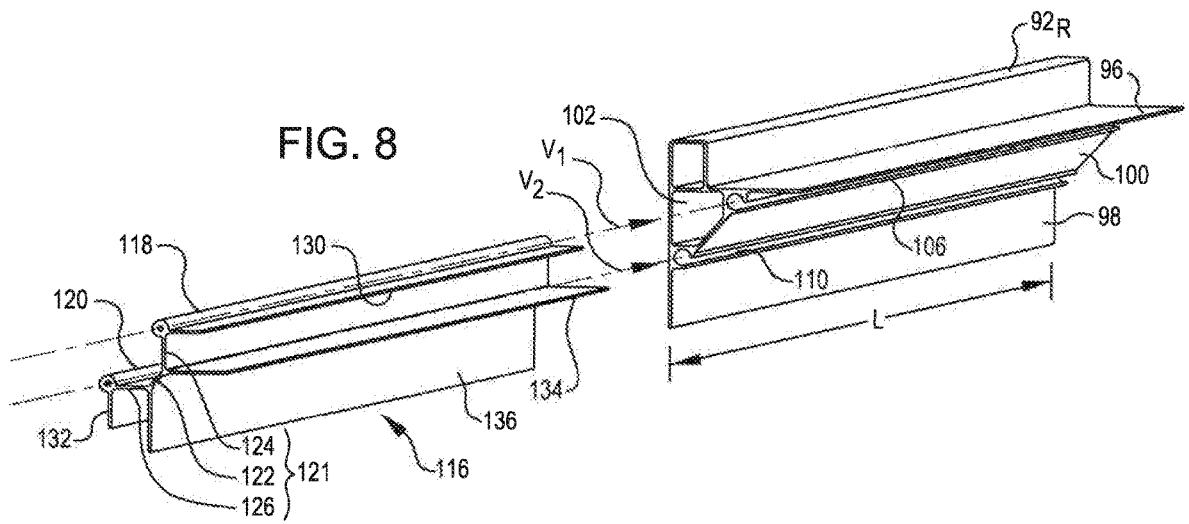
FIG. 8 provides a perspective view of the assembly of a frame assembly extrusion and an inner elastomeric extrusion, showing bead accepting slots in the frame assembly extrusion, and wherein the inner elastomeric extrusion is provided with a first bead portion sized and shaped for sliding interlocking engagement with the first bead accepting slot in the frame assembly extrusion, and a second bead portion sized and shaped for sliding interlocking engagement with the second bead accepting slot in the frame assembly extrusion, and also illustrating a generally V-shaped structure having a base portion connecting the first bead portion and the second bead portion, as well as first and second outer flanges that provide a seal against the top thermal panel and the first side thermal panel (see FIG. 6), as well as an embodiment of the frame assembly extrusion that further includes a top rail portion extending upward from a first flange of the frame assembly extrusion.

In an embodiment, especially as depicted in FIG. 11 for a half-size cart 22, a first lower joint member 150 and a second lower joint member 152 may be provided. A lower rear rod $R_1$ may be located in a lower rear rod housing $101_1$ (not shown, but structure is generally as illustrated in FIGS. 7 and 8) in the first frame assembly extrusion $92_1$, wherein the lower rear rod $R_1$ is secured in tension between the first lower joint member 150 and the second lower joint member 152. In an embodiment, a first upper joint member 154 and a second upper joint member 156 may be provided. An upper rear rod $R_2$ may be located in the upper rear rod housing $101_2$ in the second frame assembly extrusion $92_2$. The upper rear rod $R_2$ is secured in tension between first upper joint member 154 and the second upper joint member 156.

In an embodiment, a first vertical rod $R_3$ may be located in the third frame assembly extrusion $92_3$. The first vertical rod $R_3$ is thus secured in tension between the first lower joint member 150 and the first upper joint member 154. A second vertical rod $R_4$ may be located in the fourth frame assembly extrusion $92_4$. The second vertical rod $R_4$ is secured in tension between the second lower joint member 152 and the second upper joint member 156 using binding barrels B at either end of rod $R_4$.

Figure 15:
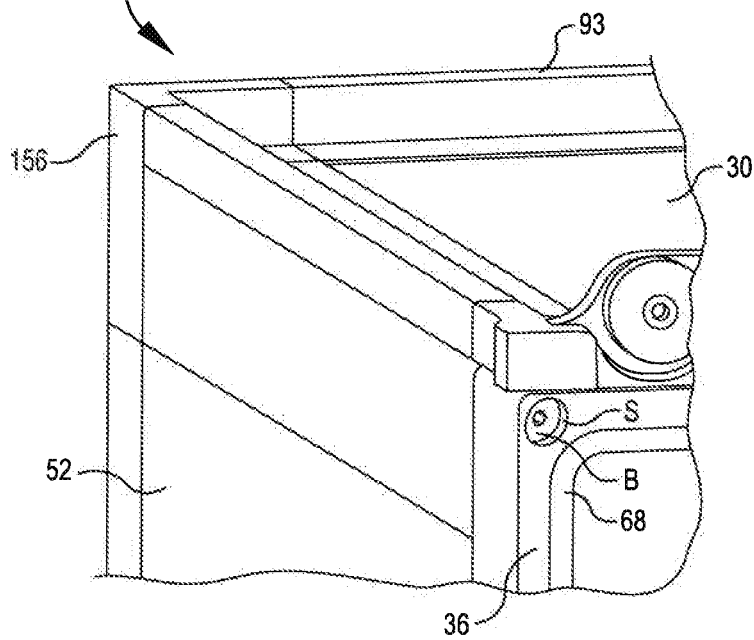
FIGS. 15 and 16 illustrate alternate construction techniques which may be useful in a half-size thermal cart (FIG. 15) or in a full size thermal cart (FIG. 16).
Figure 16:
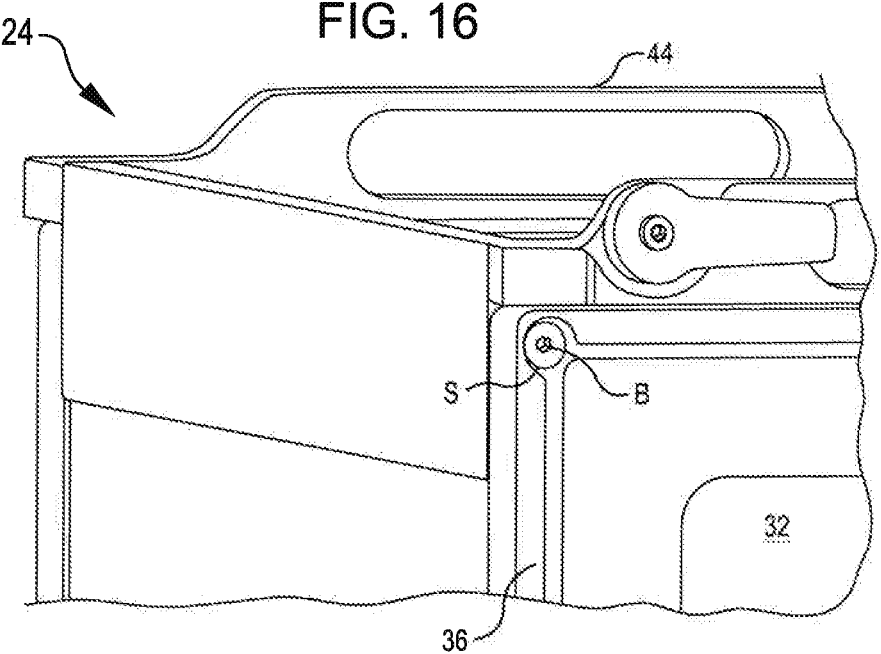

As seen conceptually in FIG. 11, and as shown in detail in FIGS. 15 and 16, in an embodiment, the front door frame 36 includes a rear peripheral flange $36_F$. In various embodiments, an interior surface $36_I$ of the peripheral flange $36_F$ is configured to receive and locate a door side $28_D$ of the first side panel 28, a door side $52_D$ of the second side panel 52, a door side $30_D$ of the top panel 30, and a door side $142_D$ of the bottom panel 142. The door frame 26 further includes a plurality of rod R receiving apertures with seats for binding barrels B, which, as can be appreciated in FIGS. 16 and 18, are configured to secure the EORT of an end of a rod R.

In various embodiments, a first right side rod $R_5$ and a pair of binding barrels B may be provided. The first right side rod $R_5$ may include threaded ends for attachment to a pair of threaded binding barrels B. The first right side rod $R_5$ is located in a fifth rod housing $101_5$ (generally as shown in FIGS. 7 and 8 above) in the fifth frame assembly extrusion $92_5$. One of the pair of binding barrels B is attached to each of the threaded ends of the first right side rod $R_5$, and the first right side rod $R_5$ is secured in tension between the first upper joint member 154 and the seat S of an upper right rod receiver 158.

In an embodiment, a second right side rod $R_7$ may be provided with a pair of binding barrels B. The second right side rod $R_7$ is located in a seventh rod housing $101_7$ in the seventh frame assembly extrusion $92_7$. One of the pair of binding barrels B is attached to one of the threaded ends of the second right side rod $R_7$, and the second right side rod $R_7$ is secured in tension between the first lower joint member 150 and the seat S of a lower right rod receiver 160.

In an embodiment, a first left side rod $R_6$ having threaded ends, and a pair of binding barrels are provided. The first left side rod $R_6$ is located in a sixth rod housing $101_6$ in the sixth frame assembly extrusion $92_6$. One of the pair of binding barrels B is attached to one of the threaded ends of the first left side rod $R_6$, and the first left side rod $R_6$ is secured in tension between the second upper joint member 156 and the seat S of a upper rod receiver 162.

In an embodiment, a second left side rod $R_8$ having threaded ends and a pair of binding barrels B are provided. The second left side rod $R_8$ is located in a eighth rod housing $101_8$ in the eighth frame assembly extrusion $92_8$. One of the pair of binding barrels B is attached to each of the threaded ends of the second left side rod $R_8$, and the second left side rod $R_8$ is secured in tension between the second lower joint member 152 and a seat S of the lower left rod receiver 164.

In an embodiment, a lower rear rod $R_1$ is provided with threaded ends, and with a pair of binding barrels B. One of the pair of binding barrels B is attached to each of the threaded ends of the lower rear rod $R_1$, and the lower rear rod $R_1$ is secured in tension between the first lower joint member 150 and the second lower joint member 152.

In an embodiment, a upper rear rod $R_2$ is provided with threaded ends, and with a pair of binding barrels B. One of the pair of binding barrels B is attached to each of the threaded ends of the upper rear rod $R_2$, and the upper rear rod $R_2$ is secured in tension between the first upper joint member 154 and the second upper joint member 156.

In an embodiment, a first vertical rod $R_3$ is provided with threaded ends, and with a pair of binding barrels B. One of the pair of binding barrels B is attached to each of the threaded ends of the first vertical rod $R_3$, and the first vertical rod $R_3$ is secured in tension between the first lower joint member 150 and the first upper joint member 154.

In an embodiment, a second vertical rod $R_4$ is provided with threaded ends, and with a pair of binding barrels B. One of the pair of binding barrels B is attached to each of the threaded ends of the second vertical rod $R_4$, and the second vertical rod $R_4$ is secured in tension between the second lower joint member 152 and the second upper joint member 156.

Figure 14:
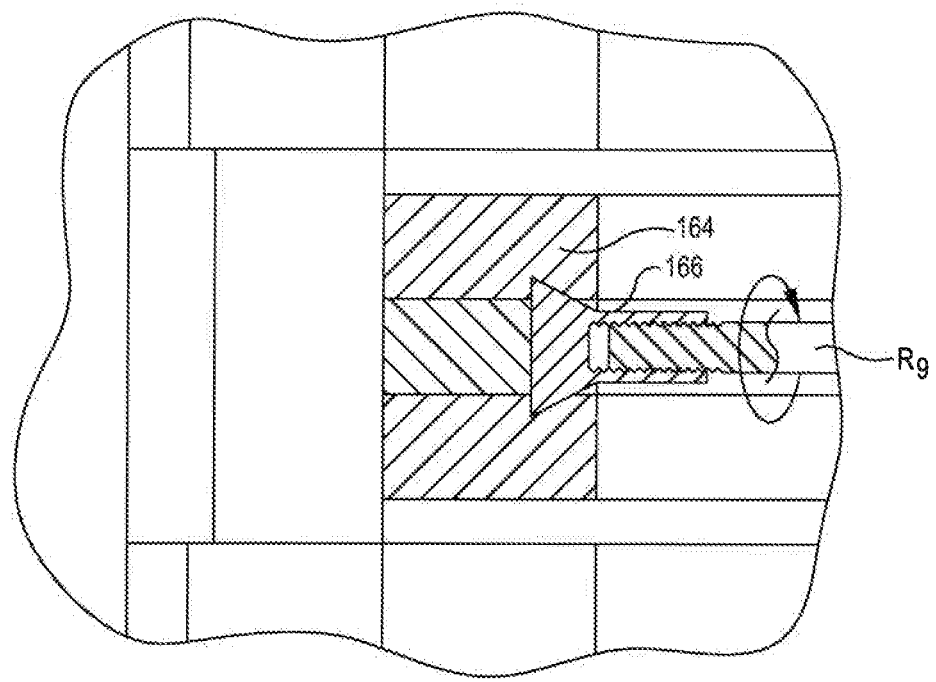
FIG. 14 provides a partial cross-sectional view of an embodiment for rod installation at a "mid" location—i.e. at a mid-shelf location between the top and bottom of a thermal cart. This is especially useful in a half-size thermal cart, and this drawing figure shows use of a threaded insert which is provided in a molded shelf support, so that threaded rods are secured at the rear in the threaded inserts (horizontally oriented rods are provided when used in a mid-shelf location), and with binding barrels at a front support, to secure the rods in tension.
Figure 26:
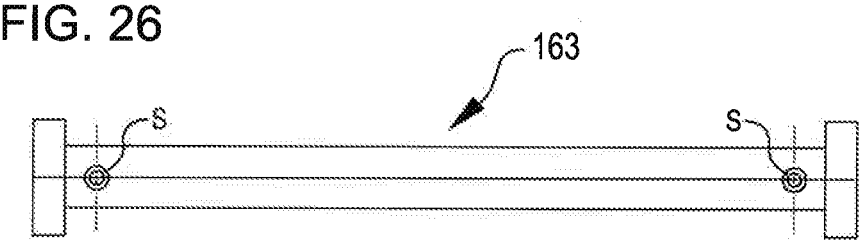
FIG. 26 provides a side elevation view of a support shelf, showing locations were binding barrels may be utilized to secure horizontally extending rods which secure the support shelf to the rear panel.
Figure 27:
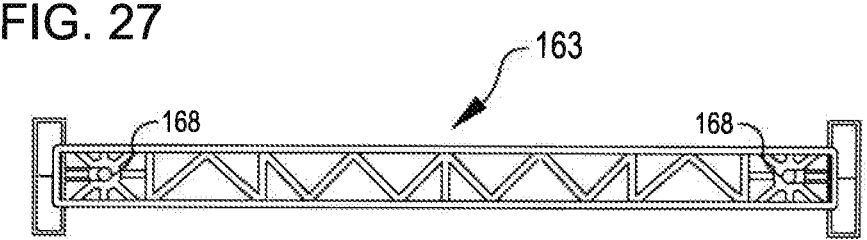
FIG. 27 is a cross-sectional view of the support shelf just shown in FIG. 26, now showing the internal supports as well as the locations for seats of binding barrels which are used to secure the support shelf to the rear panel.

In an embodiment, a support shelf 48 may be provided as indicated in FIG. 2, with front stiffener (163 in FIG. 2) and rear stiffener (165 in FIG. 11). A side elevation view of a front stiffener for a support shelf 48 is shown in FIG. 26, and a cross-section view of the support shelf 48, looking back at stiffener 162, is shown in FIG. 27. Front stiffener 163 and rear stiffener 165 may be provided as molded components, or affixed to the first side panel 28 and to the second side panel 52. In any event, a first central rod $R_9$ may be provided with threaded ends. And, a second central rod $R_{10}$ may be provided with threaded ends. In an embodiment, in the rear stiffener 165, a pair of threaded inserts 166 may be provided (see FIG. 14) aligned with the passageway 168 (see FIGS. 26 and 27) in the front stiffener 163 at seats S. In this embodiment, rods $R_9$ and $R_{10}$ are secured by passing the rods $R_9$ and $R_{10}$ through passageways 168 and then screwing one end of the rods $R_9$ and $R_{10}$ into the threaded inserts 166. Then, binding barrels B are used to secure rods $R_9$ and $R_{10}$ in tension to the front stiffener 163 at seats S.

With respect to the embodiment for a half-size thermal cart 22 shown in FIG. 11 or variations thereof, or for the frame assembly extrusions used in a full size thermal cart 24, it is to be understood that an inner elastomeric extrusion 116 is provided with each of the various frame assembly extrusions $92_1$ to $92_x$, where x is a positive integer, and in an embodiment, a integer from 1 to 8. In this regard, in various embodiments, the components of the inner elastomeric extrusion and its various flanges may be provided substantially as set forth in FIGS. 7, 8, and 10, as described in the accompanying discussion provided herein above. Thus, in various embodiments, the first inner flange 134 and the second inner flange 136 seal against adjacent thermal insulating material, which for a selected frame assembly extrusion $92_X$ may be any two of (a) the rear panel 140, (b) the first side panel 28, (c) the second side panel 52, (d) the top panel 30, and (e) the bottom panel 142.

Referring back to FIG. 7, it can be seen that the thermal insulating material provided (e.g. in a first side panel 28 and in a top panel 30 as shown), the thermal insulating material may include (a) a thermoplastic inner lining PIL, (b) at least one vacuum insulated panel VIP, and (c) an outer structural panel OSP. As seen in FIG. 7, the thermal insulating material adjacent each frame assembly extrusion $92_X$ may further include a sealing slot 161 in the composite outer structural panel OSP. The sealing slot 161 is sized and shaped to receive therein either a first outer flange 130 or a second outer flange 132 of the inner elastomeric extrusion 116. With this construction, the inner elastomeric extrusion 116 provides a thermal barrier at the various corners of a half-size thermal cart 22 or a full size thermal cart 24.

Turning now to FIG. 12, an embodiment for a corner joint 170 as may be used in a half-size thermal cart 22 is illustrated. In this embodiment a corner joint 170 similar to joint 154 is provided, however the vertical threaded rod 172 (e.g. similar to $R_3$ in FIG. 11) is threaded into a tapped hole 174, and thus, a binding barrel B is not required. In this embodiment, the two horizontal rods (similar to $R_2$ and $R_5$ as described above) utilize binding barrels B which are located at seats S in a corner joint 170. Filler blocks F are provided for insulation.

In FIG. 13, an embodiment for a bottom corner 180 is shown as may be used in a half-size thermal cart 22. In this embodiment a bottom corner joint 180 similar to joint 150, and binding barrels B are utilized for tensioning all three rods (e.g. $R_3$, $R_1$, and $R_7$ as shown in FIG. 11). The vertical rod $R_3$ is tightened into the corner joint 180 using binding barrels B. The first horizontal rod $R_1$ and the second horizontal rod $R_7$ are all tightened into the corner joint 180 with binding barrels B.

FIGS. 15 and 16 provide details for differing details of construction as may be useful in embodiments for a half-size thermal cart 22 (in FIG. 15) or for a full size thermal cart 24 (in FIG. 16). As shown in FIG. 15, in an embodiment, a half-size thermal cart 22 may use a corner joint 156 at the rear (where a binding barrel B is used to secure a rod R, not shown), and use a seat S in the door frame 36 for seating a binding barrel B, for securing a rod R in tension, to provide a robust structural configuration for the half-size thermal cart 22. As suggested in FIG. 16, in an embodiment, a full size thermal cart 24 may be constructed where a door frame 36 having a seat S for locating binding barrel B may be used at the front, and a rear panel 140 may be provided where a seat S is also provided for locating a binding barrel B (also called a barrel nut), to secure a rod R (rear panel 140 not shown, but externally substantially a mirror image of the front as illustrated) in tension.

Figure 19:
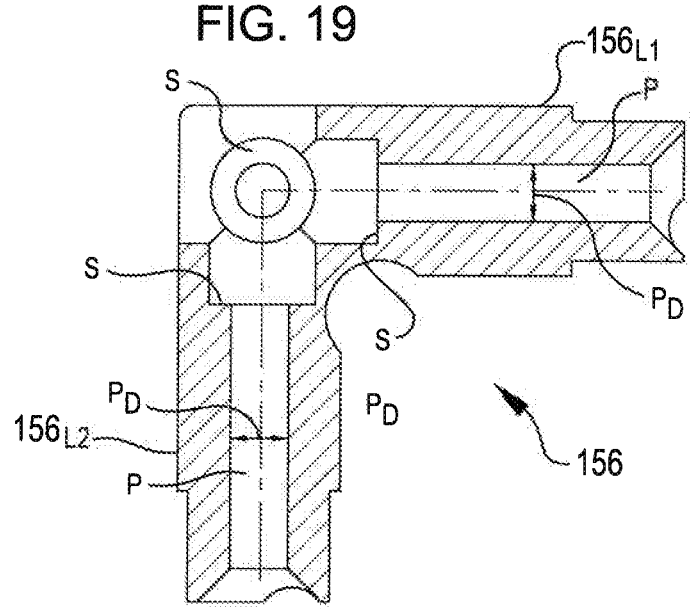
FIGS. 19, 20, 21, and 22 show various features of a corner connector joint as may be used in various embodiments for a thermal cart.
Figure 20:
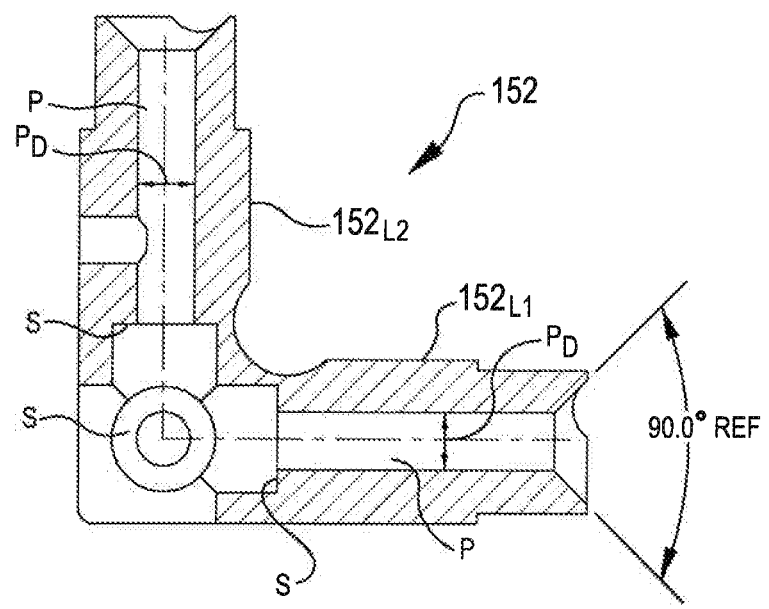
Figure 21:
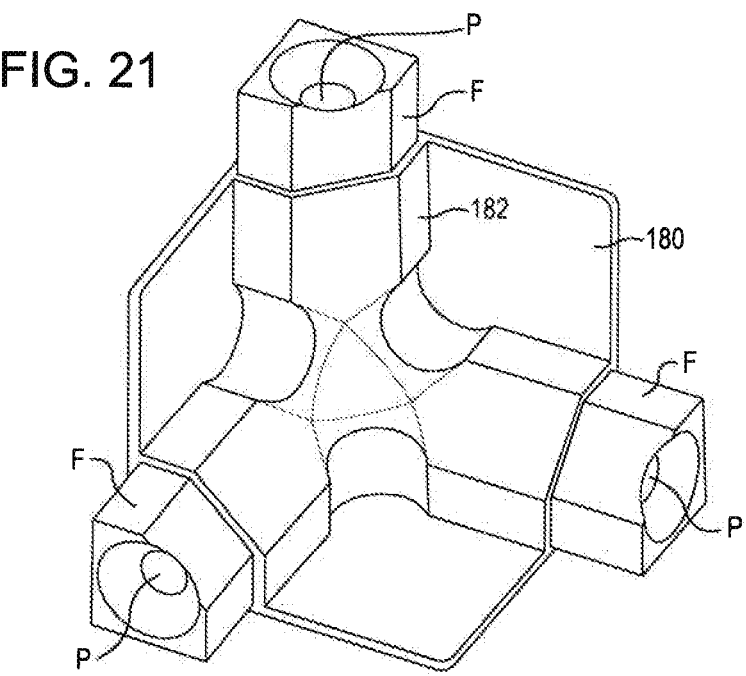
Figure 22:
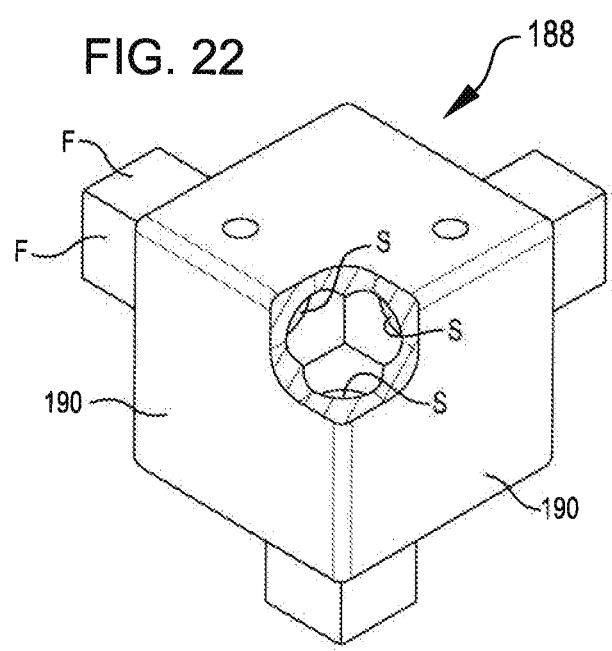

FIGS. 19, 20, 21, and 22 show various features of a corner connector joint as may be used in various embodiments for a thermal cart. FIG. 19 shows a cross-sectional view for an embodiment for an upper corner joint 156 as may be used in an embodiment for a thermal cart, where provisions for securing rods R in three different directions are provided. The upper corner joint 156 includes three legs $156_{L1}$, $156_{L2}$, and $156_{L3}$ (see FIG. 21 which provides a mirror image of the lower corner joint connector), as leg $156_{L3}$ is not visible in the cross-section provided in FIG. 19. Each of the just mentioned three legs of corner joint 156 have an internal passageway P therein of diameter PD of sufficient width to allow insertion of a rod R of selected diameter RD to fit therethrough. Seats S are provided for locating binding barrels B, when a threaded binding barrel B is attached to a threaded rod R, as described above. Likewise, FIG. 20 shows a cross-sectional view for an embodiment for a lower corner joint 152 as may be used in an embodiment for a thermal cart, where provisions for securing rods R in three different directions are provided. The lower corner joint 152 includes three legs $152_{L1}$, $152_{L2}$, and $152_{L3}$ (see FIG. 21, as leg $152_{L3}$ is not visible in the cross-section provided in FIG. 20). Each of the just mentioned three legs of corner joint 152 have an internal passageway P therein of diameter PD of sufficient width to allow insertion of a rod R of selected diameter RD to fit therethrough. Seats S are provided for locating binding barrels B, when a threaded binding barrel B is attached to a threaded rod R, as described above. FIG. 21 shows an embodiment for a lower corner joint 152, as just illustrated in FIG. 20, as incorporated into and secured in a corner of a thermal cart, and with insulation filling F covering the various otherwise exposed portions of the lower corner joint 152. An aluminum external corner piece 181 is also provided, which may include collar 182 for securing lower corner joint 152. FIG. 22 shows a partially broken away perspective view of an embodiment for an assembled upper corner joint 188, incorporating the corner joint 156 as just illustrated in FIG. 19, as secured in a corner of a thermal cart, and with insulation filler F covering the various otherwise exposed portions of the lower corner joint 156. An aluminum external corner piece 190 is provided.

Figure 23:
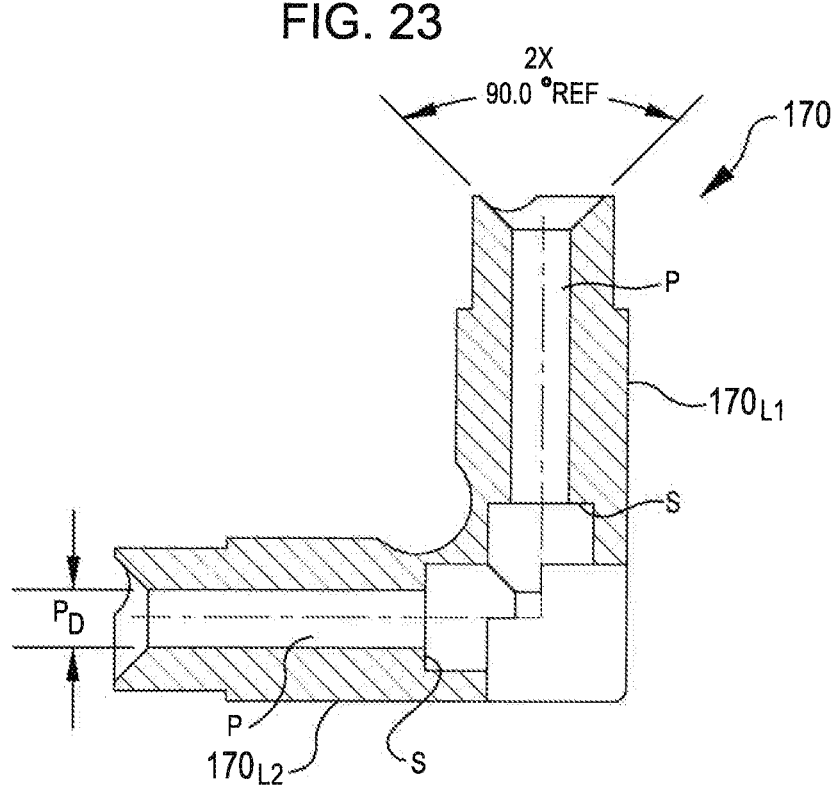
FIGS. 23, 24, and 25 show various features of a corner frame joint as may be used in various embodiments for a thermal cart.
Figure 24:
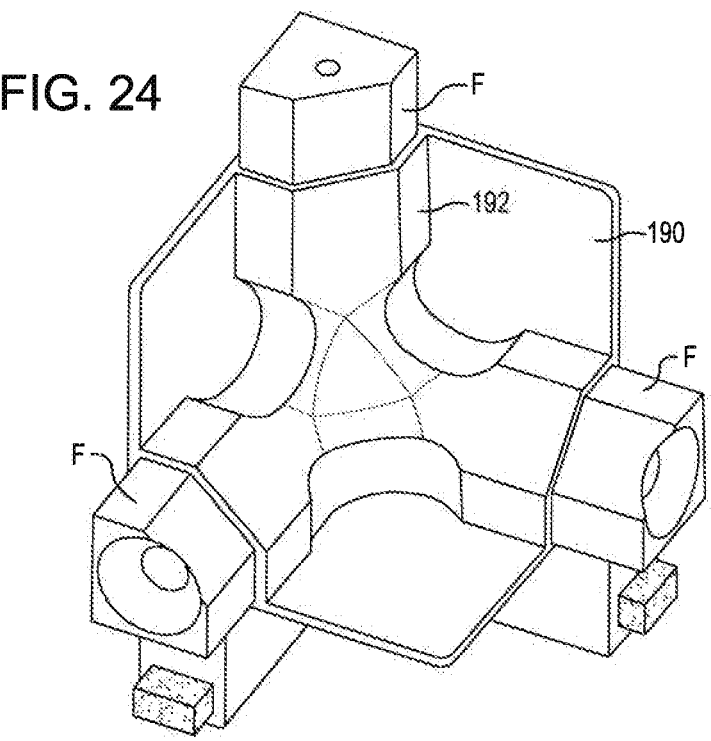
Figure 25:
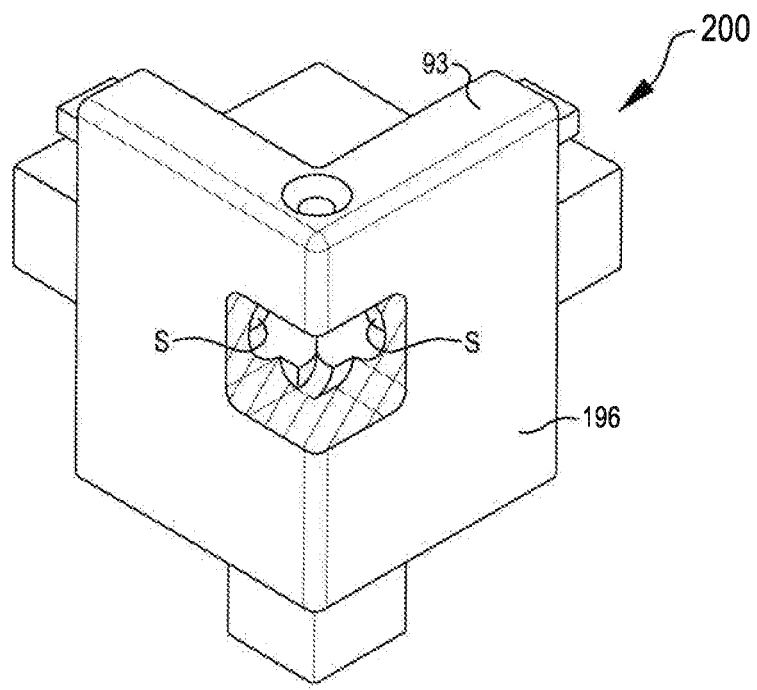

FIGS. 23, 24, and 25 show various features of a corner frame joint 170 as may be used in various embodiments for a thermal cart. FIG. 23 provides a cross-sectional view of a corner frame joint 170 as may be used to join rods R in two directions (See FIG. 12). Corner joint 170 has two legs, $170_{L1}$ and $170_{L2}$. Passageway P of diameter $P_D$ allows for insertion of rods R, as mentioned above, and seats S are provided for tightening of binding barrels, as depicted in FIG. 18. FIG. 24 provides a perspective view of an embodiment for a corner frame joint in use, incorporating a corner frame joint 170 as just illustrated in FIG. 23, as secured in a corner of a thermal cart, and with insulation/filling F covering the various otherwise exposed portions of the corner frame joint 170. An aluminum corner frame 191 is provided, with collar 192 for locating lower corner frame joint 170. FIG. 25 provides a perspective view of an upper corner frame joint 200, with top rail 93, and aluminum corner frame 196. In an embodiment, the upper corner frame joint 200 provides two legs $200_{L1}$ and $200_{L2}$ in horizontal direction.

Figure 28:
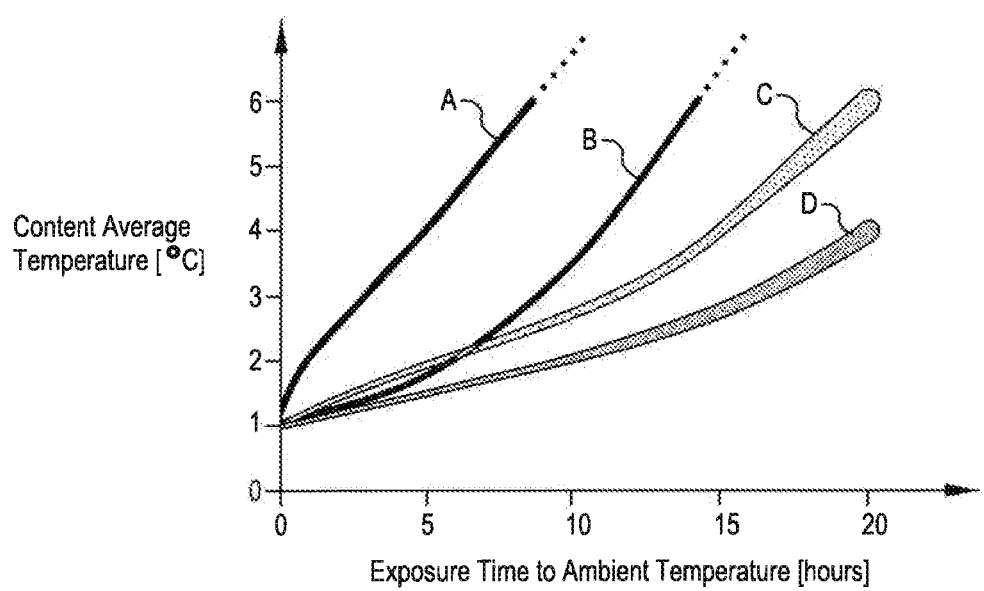
FIG. 28 is a graph showing the improvement achieved by thermal carts constructed according to the design(s) set forth herein, as compared to prior art thermal cart designs.

The exemplary results provided by thermal carts as described herein are graphically illustrated in FIG. 28. Curve A shows the thermal cart content average temperature over time for a standard galley cart using two kilograms of dry ice. Curve B shows the thermal cart content average temperature over time for a competitive thermal cart content average temperature, when using four kilograms of dry ice. Curve C shows the thermal cart content average temperature over time for a thermal cart as described and claimed herein, when the thermal cart has thirty five (35) kilograms of content therein. Curve D shows the thermal cart content average temperature over time for a thermal cart as described and claimed herein, when the thermal cart has seventy (70) kilograms of content therein. Clearly a thermal cart as described and claimed herein outperforms the existing galley carts for aircraft service, without the use of dry ice or special cooling compartments. An advantage of the improved thermal performance of the thermal carts described and claimed herein is that more internal volume 46 is provided for storage of consumables per thermal cart. Consequently, more consumables may be carried per cart. And, the very small temperature rise for a twenty hour period, i.e. less than four degrees Celsius (4° C.) when fully loaded as noted in curve D, may allow operators to use catering at hub locations for out and back flights, or for certain multi-leg flights, rather than having to provide catering to aircraft at multiple remote locations.

Optionally, one or more ice shelves 55 may be provided for use in half-size thermal cart 22 or in a full size thermal cart 24. For flight durations in the four (4) to six (6) hour time frame, ice shelves 55 are unnecessary. For flights in the twelve (12) to fourteen (14) hour time frame, one ice shelf 55 provides capability to maintain contents of a half-size thermal cart 22 under four degrees Centigrade (4° C.). For operations extending in excess of fourteen hours, two ice shelves 55 could be utilized. For a full-size thermal cart 24, with respect to the just mentioned time frames, zero (0), or two (2), or four (4) ice shelves 55 may be utilized to maintain contents of a full-size thermal cart 24 under four degrees Centigrade (4° C.).

In the foregoing description, for purposes of explanation, numerous details have been set forth in order to provide a thorough understanding of the disclosed exemplary embodiments for the design of thermal carts suitable for use in storing cold foodstuffs on transport category aircraft. However, certain of the described details may not be required in order to provide useful embodiments, or to practice selected or other disclosed embodiments. In particular, end of rod tooling variations, and connector variations for such end of rod tooling variations, may be utilized and still provide rods in tension to secure thermal cart components (e.g. the door frame and the rear panel, or the top panel and the bottom panel) together as described herein. Further, for descriptive purposes, various relative terms may be used. Terms that are relative only to a point of reference are not meant to be interpreted as absolute limitations, but are instead included in the foregoing description to facilitate understanding of the various aspects of the disclosed embodiments. And, various actions or activities in any method described herein may have been described as multiple discrete activities, in turn, in a manner that is most helpful in understanding the present invention. However, the order of description should not be construed as to imply that such activities are necessarily order dependent. In particular, certain operations may not necessarily need to be performed precisely in the order of presentation. And, in different embodiments of the invention, one or more structures may be simultaneously provided, or eliminated in part or in whole while other elements may be added (e.g. use of a threaded sleeve rather than a threaded joint connector). Also, the reader will note that the phrase "in an embodiment" or "in one embodiment" has been used repeatedly. This phrase generally does not necessarily refer to the same embodiment; however, it may. Finally, the terms "comprising", "having" and "including" should be considered synonymous, unless the context dictates otherwise.

It will be understood by persons skilled in the art that embodiments for configurations of thermal carts have been described herein only to an extent appropriate for such skilled persons to make and use such novel thermal carts. Additional details may be worked out by those of skill in the art for a selected set of specifications, useful life, materials of construction, and other design criteria, such as the thickness of thermally insulating panels, or the precise materials, size, or shape of tensioning elements necessary to secure panels of thermally insulating material to each other.

Importantly, the aspects and embodiments described and claimed herein may be modified from those shown without materially departing from the novel teachings and advantages provided, and may be embodied in other specific forms without departing from the spirit or essential characteristics thereof. Therefore, the embodiments presented herein are to be considered in all respects as illustrative and not restrictive or limiting. As such, this disclosure is intended to cover the structures described herein and not only structural equivalents thereof, but also equivalent structures.

Although only certain specific embodiments for novel thermal carts have been shown and described, the invention is not limited to such embodiments. Rather, the invention is to be defined by the appended claims and their equivalents when taken in combination with the description. Numerous modifications and variations are possible in light of the above teachings. Therefore, the protection afforded to this invention should be limited only by the claims set forth herein, and the legal equivalents thereof.

The invention claimed is:

1. A thermal cart, the thermal cart configured for holding consumables for in-flight distribution on an aircraft, the thermal cart comprising:
   an enclosure, the enclosure formed by a plurality of panels including: a first side panel, a second side panel, a top panel, a bottom panel, one or more door frames, and a door in each of the one or more door frames, and further comprising a rear panel when only one door frame and one door are provided;
   wherein the enclosure provides an internal volume for storage of consumables, wherein the first side panel, second side panel, top panel, bottom panel, each door, and the rear panel, each comprise thermally insulating material;
   a plurality of frame assembly extrusions, wherein each of the frame assembly extrusions comprises an elongated member having a first flange, a second flange, and a strengthening portion, the first flange and the second flange oriented at a right angle, and wherein the strengthening portion extends between the first flange and the second flange, wherein the first flange, the second flange, and the strengthening portion are connected to provide a rod housing therebetween; and
   a plurality of rods having ends comprising end of rod tooling,
   at least one of the plurality of rods disposed in the rod housing in at least one of the plurality of frame assembly extrusions, each rod secured in tension by adjustment between the end of rod tooling and complementary tooled structures, the complementary tooled structures secured at joints at sides of the plurality of panels forming the enclosure.

2. The thermal cart as set forth in claim 1, wherein the at least one of the plurality of rods are disposed outside of a frame assembly extrusion, and wherein at least some of rods disposed outside of a frame assembly extrusion are horizontally oriented, wherein each rod disposed outside of a frame assembly extrusion is secured in tension by adjustment between the end of rod tooling and complementary tooled structures each secured at a seat, wherein at least one of the seats is located in (a) one of the panels comprising the enclosure, or (b) in a support shelf, or (c) in the door frame.

3. The thermal cart as set forth in claim 1, wherein the elongated member of one or more of the frame assembly extrusions further comprises a first slot wall defining a longitudinally extending first bead accepting slot, and a second slot wall defining a longitudinally extending second bead accepting slot.

4. The thermal cart as set forth in claim 3, wherein the first bead accepting slot and the second bead accepting slot each comprise an elongated partially cylindrical slot having an internal diameter DS, wherein the elongated partially cylindrical slot further comprises a neck opening of width DO, wherein the neck opening of width DO is less than the internal diameter DS.

5. The thermal cart as set forth in claim 3, further comprising an inner elastomeric extrusion, the inner elastomeric extrusion having a first bead portion sized and shaped for sliding interlocking engagement with the first bead accepting slot, and a second bead portion sized and shaped for sliding interlocking engagement with the second bead accepting slot, and a generally V-shaped structure having a base portion connecting the first bead portion and the second bead portion.

6. The thermal cart as set forth in claim 5, wherein the inner elastomeric extrusion further comprises a first outer flange, wherein the first outer flange extends outward from the first bead portion.

7. The thermal cart as set forth in claim 6, wherein the inner elastomeric extrusion further comprises a second outer flange, wherein the second outer flange extends outward from the second bead portion.

8. The thermal cart as set forth in claim 5, wherein the inner elastomeric extrusion further comprises a first inner flange, wherein the first inner flange extends outward from the generally V-shaped structure.

9. The thermal cart as set forth in claim 8, wherein the inner elastomeric extrusion further comprises a second inner flange, wherein the second inner flange extends outward from the generally V-shaped structure.

10. The thermal cart as set forth in claim 7, wherein the first outer flange and the second outer flange are identically sized and shaped.

11. The thermal cart as set forth in claim 9, wherein the first inner flange and the second inner flange are identically sized and shaped.

12. The thermal cart as set forth in claim 9, wherein the first inner flange and the second inner flange seal against adjacent thermal insulating material, which for a selected frame assembly extrusion is any two of (a) the rear panel, (b) the first side panel, (c) the second side panel, (d) the top panel, and (e) the bottom panel.

13. The thermal cart as set forth in claim 1, wherein the thermally insulating material comprises (a) a thermoplastic inner lining, (b) at least one vacuum insulated panel, and (c) an outer structural panel.

14. The thermal cart as set forth in claim 13, wherein the outer structural panel comprises a composite panel.

15. The thermal cart as set forth in claim 13, wherein the outer structural panel comprises an edge portion having a slot therein, and wherein the slot is sized and shaped to receive therein either a first outer flange or a second outer flange, where the thermal cart comprises a combination of an edge portion having a slot therein and either a first outer flange or a second outer flange, to thereby provide a thermal barrier at the edge portion of the outer structural panel.

16. The thermal cart as set forth in claim 15, further comprising an inner elastomeric extrusion having a first inner flange and a second inner flange, and wherein the thermoplastic inner lining has an outer surface, and wherein the first inner flange and a second inner flange form a seal against the outer surface of the thermoplastic inner lining, to thereby provide a thermal barrier.

17. The thermal cart as set forth in claim 13, wherein the at least one vacuum insulated panel comprises a vacuum insulated panel having a thermal transmittance value of about zero point eight (0.8) watts per meter squared per degree Kelvin, or less.

18. The thermal cart as set forth in claim 13, wherein the thermoplastic inner lining comprises polycarbonate material.

19. The thermal cart as set forth in claim 18, wherein the polycarbonate material comprises Lexan F60025, or Boltaron 4330, or polycarbonate material with equivalent thermal transmittance.

20. The thermal cart as set forth in claim 13, wherein the outer structural panel comprises a polyurethane based foam core material with a phenolic pre-preg facing.

21. The thermal cart as set forth in claim 1, wherein the at least one door comprises (a) an inner side having edge portions, and (b) an outer side, each door frame further comprises an exterior side having an interior perimeter portion, the interior perimeter portion having a compressible seal disposed therein, whereby edge portions of the inner side of the at least one door are urged against and compress the compressible seal when the at least one door is in a closed position.

22. The thermal cart as set forth in claim 21, wherein the compressible seal comprises a low durometer elastomer seal.

23. The thermal cart as set forth in claim 21, wherein the compressible seal is overmolded into each door frame, so that the compressible seal is fused to each door frame.

24. The thermal cart as set forth in claim 21, further comprising a door lock, wherein the door lock comprises a manually actuated rotating latch, wherein the rotating latch moves between a locked, sealed position, and an open position, when manipulated.

25. The thermal cart as set forth in claim 24, wherein the door lock comprises a latch guide having a cam surface, so that when the door lock is moved from the open position to the locked, sealed position, the latch guide moves the rotating latch inward, and compresses the at least one door inward toward the compressible seal, to provide a compressed, sealed condition when the rotating latch is in the locked position.

* * * * *